US012586315B2

(12) United States Patent
Inayoshi et al.

(10) Patent No.: US 12,586,315 B2
(45) Date of Patent: Mar. 24, 2026

(54) INFORMATION PROCESSING DEVICE, INFORMATION PROCESSING METHOD, AND PROGRAM

(71) Applicant: NEC Corporation, Tokyo (JP)

(72) Inventors: Kiri Inayoshi, Tokyo (JP); Takashi Nonaka, Tokyo (JP); Kentaro Nishida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 18/101,943

(22) Filed: Jan. 26, 2023

(65) Prior Publication Data

US 2023/0316656 A1     Oct. 5, 2023

(30) Foreign Application Priority Data

Mar. 30, 2022    (JP) ................................. 2022-056537

(51) Int. Cl.
*G06T 19/00*       (2011.01)
*G06T 3/40*        (2024.01)
*G06T 13/40*       (2011.01)

(52) U.S. Cl.
CPC ............... *G06T 19/00* (2013.01); *G06T 3/40* (2013.01); *G06T 13/40* (2013.01); *G06T 2210/08* (2013.01); *G06T 2219/024* (2013.01)

(58) Field of Classification Search
CPC  G06T 19/00; G06T 3/40; G06T 13/40; G06T 2210/08; G06T 2219/024; H04L 67/131; H04L 67/535; G06F 3/011
See application file for complete search history.

(56) References Cited

U.S. PATENT DOCUMENTS

2004/0066384 A1     4/2004  Ohba
2005/0253843 A1    11/2005  Losasso Petterson et al.
(Continued)

FOREIGN PATENT DOCUMENTS

JP       H07-271999 A     10/1995
JP       2005-332395 A    12/2005
(Continued)

OTHER PUBLICATIONS

Strugar, F. (2009). Continuous Distance-Dependent Level of Detail for Rendering Heightmaps. Journal of Graphics, GPU, and Game Tools, 14(4), 57-74. https://doi.org/10.1080/2151237X.2009. 10129287 (Year: 2011).*

(Continued)

*Primary Examiner* — Jeffery A Brier
(74) *Attorney, Agent, or Firm* — Sughrue Mion, PLLC

(57) ABSTRACT

An information processing device (1) includes at least one processor, the at least one processor carrying out: an acquisition process for acquiring first spatial information indicating a reference cell serving as a cell in which a user is located in a virtual space, second spatial information indicating the virtual space located around the reference cell, and third spatial information indicating the virtual space located more distantly than a peripheral cell; and a spatial information process including a first process in which the first spatial information is used, a second process in which the second spatial information is used, and a third process in which the third spatial information is used and which involves a smaller processing load than the second process.

20 Claims, 8 Drawing Sheets

(56) References Cited

U.S. PATENT DOCUMENTS

| | | | |
|---|---|---|---|
| 2016/0300392 A1* | 10/2016 | Jonczyk | G06T 19/003 |
| 2018/0005429 A1* | 1/2018 | Osman | A63F 13/56 |
| 2018/0165887 A1* | 6/2018 | Iwai | A63F 13/86 |
| 2018/0350135 A1* | 12/2018 | Castaneda | G06T 19/20 |
| 2018/0373412 A1* | 12/2018 | Reif | G06F 3/04815 |
| 2019/0287495 A1* | 9/2019 | Mathur | G06F 3/011 |
| 2020/0242280 A1* | 7/2020 | Pavloff | H04L 65/61 |
| 2021/0142552 A1 | 5/2021 | Kimura et al. | |
| 2022/0295014 A1* | 9/2022 | Dhawan | G06T 19/006 |

FOREIGN PATENT DOCUMENTS

| | | |
|---|---|---|
| JP | 2010-092507 A | 4/2010 |
| JP | 2014-219747 A | 11/2014 |
| JP | 2016-099792 A | 5/2016 |
| JP | 2018-028789 A | 2/2018 |
| JP | 2018-097427 A | 6/2018 |
| WO | 2018/047730 A1 | 3/2018 |
| WO | 2019/031005 A1 | 2/2019 |

OTHER PUBLICATIONS

JP Office Action for JP Application No. 2022-056537, mailed on Nov. 18, 2025 with English Translation.
Toshiaki Saeki et al., "QoS Control of Avatar's Display on CyberSpace System with Scalable Participants", Information Processing Society of Japan Research Report, Feb. 26, 1999, vol. 99, No. 18, p. 91-96.

* cited by examiner

FIG. 3

Start

S1

S11

Acquire first spatial information indicating virtual space in reference cell, second spatial information indicating virtual space in peripheral cell, and third spatial information indicating virtual space in distant cell

S12

Carry out first process in which first spatial information is used, second process in which second spatial information is used, and third process in which third spatial information is used End

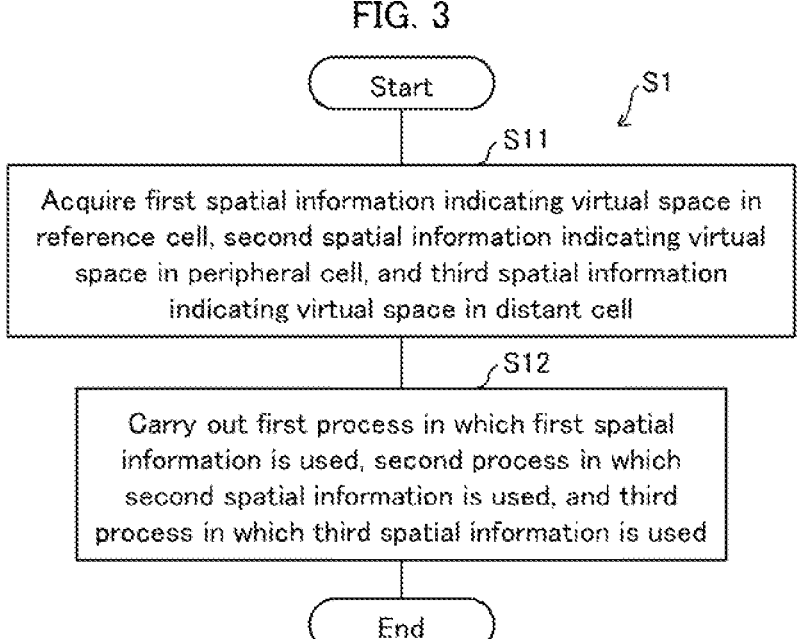

FIG. 4

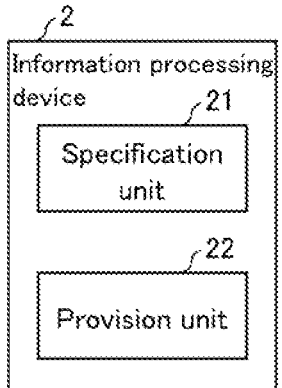

2

Information processing device

21

Specification unit

22

Provision unit

FIG. 7
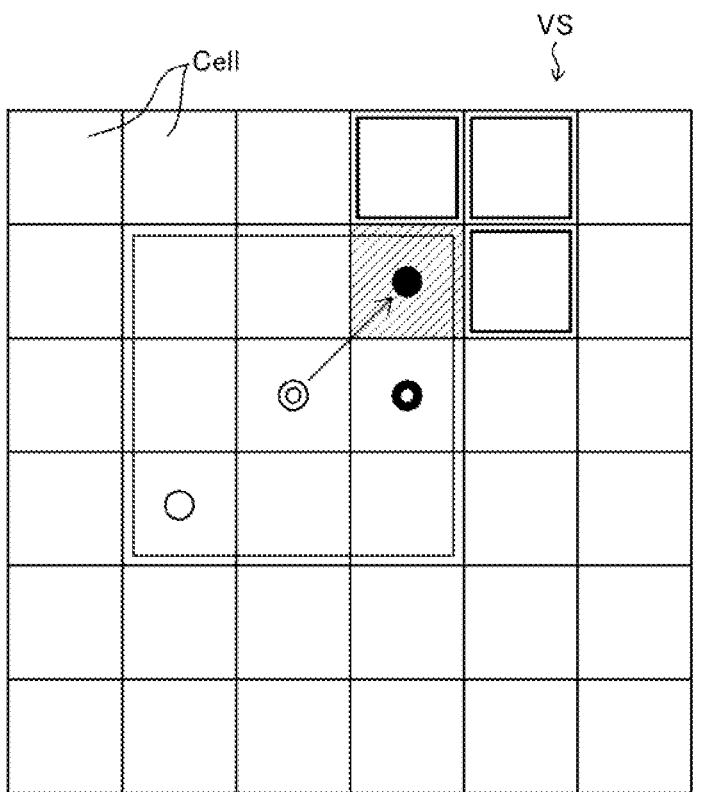
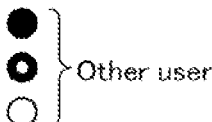

FIG. 8

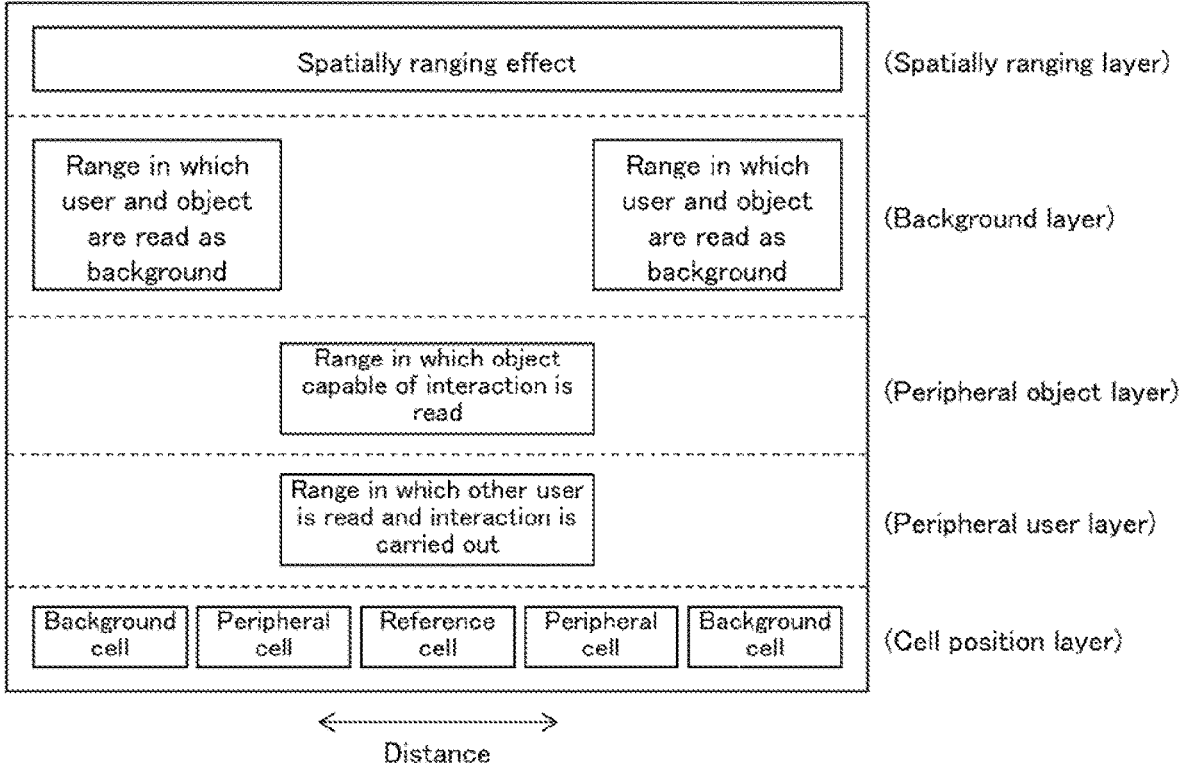

| | (Spatially ranging layer) |
| --- | --- |
| Spatially ranging effect | |

| Range in which user and object are read as background | | Range in which user and object are read as background | (Background layer) |

| Range in which object capable of interaction is read | (Peripheral object layer) |

| Range in which other user is read and interaction is carried out | (Peripheral user layer) |

| Background cell | Peripheral cell | Reference cell | Peripheral cell | Background cell | (Cell position layer) |

←——————→
Distance

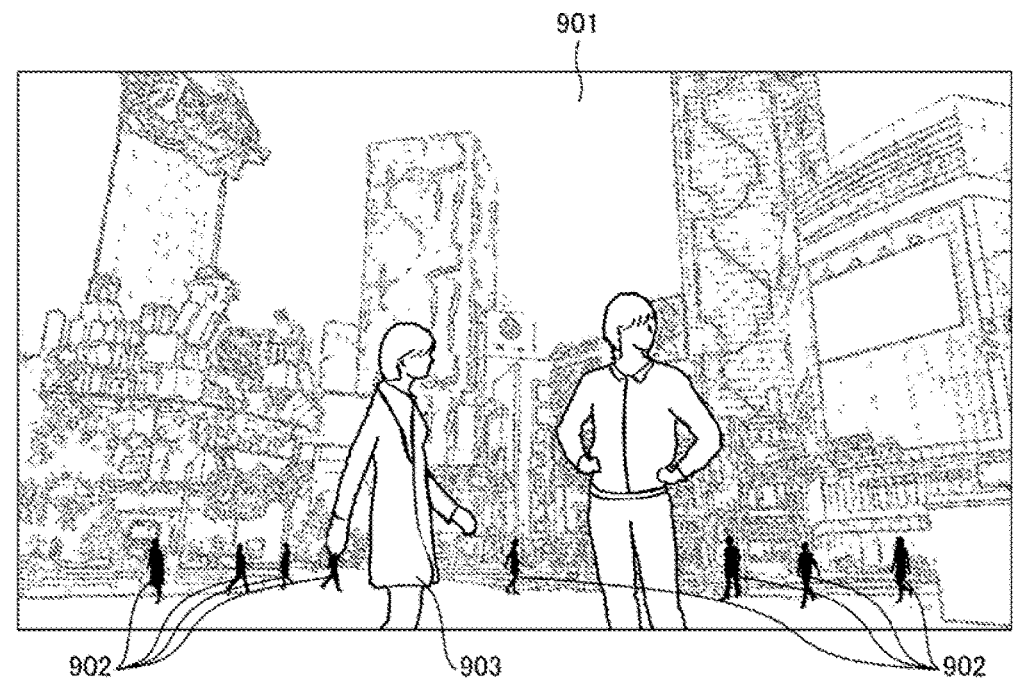

INFORMATION PROCESSING DEVICE, INFORMATION PROCESSING METHOD, AND PROGRAM

CROSS REFERENCE TO RELATED APPLICATIONS

This application is based upon and claims the benefit of priority from Japanese Patent Application No. 2022-056537 filed on Mar. 30, 2022, the disclosure of which is incorporated herein in its entirety by reference.

TECHNICAL FIELD

The present invention relates to an information processing device, an information processing method, and a program.

BACKGROUND ART

A so-called VR social networking service (VRSNS) is popular that enables a plurality of users to use avatars to participate in a virtual reality (VR) space, which is configured on a computer, so as to interact with each other. In a VRSNS, a plurality of users participate, as avatars through the Internet, in a VR space that is constructed on a VR server and transmitted to a terminal of each of the users.

However, an increase in number of participating avatars accordingly results in an increase in amount of avatar information. This results in an increase in information processing time of a server or a terminal of a user and in communication time between the server and the terminal. Then, movement of the avatars and a VR space serving as a background of the avatars is slowed or stopped. This impairs a sense of reality. In order to avoid such a state, measures have been carried out such as limiting the number of users that can participate in the VR space.

As a technique for reducing the amount of transmission and reception of information, Patent Literature 1 discloses, for example, the following technique. The technique is such that a transmission rate at which positional information and action information of each of other avatars are to be transmitted to a terminal device corresponding to one avatar is determined on the basis of positional information of the one avatar and the positional information of the other avatars.

Furthermore, as a technique for preventing or reducing a delay in displaying a high-resolution image, Patent Literature 2 discloses the following technique. The technique is such that, in a case where an image of a frame is divided into a plurality of individual regions and displayed and an image of at least one individual region is delayed in the timing of processing of the frame, an image of an individual region of a previous frame is applied to generate a composite image. This is considered to make it possible to prevent or reduce a delay in displaying a high-resolution image.

CITATION LIST

Patent Literatures

Patent Literature 1

Japanese Patent Application Publication, Tokukai, No. 2018-28789

Patent Literature 2

International publication No. WO2018/047730

SUMMARY OF INVENTION

Technical Problem

In the technique disclosed in Patent Literature 1, a transmission rate at which positional information and action information of another avatar that is close to a certain avatar and satisfies a predetermined condition are to be transmitted is determined so as to be higher than a transmission rate at which positional information and action information of another avatar that is distant from the certain avatar and satisfies a predetermined condition. However, whether an avatar is close to or distant from the certain avatar does not change the amount of information to be transmitted. This makes it impossible to avoid occurrence of a delay in the distant avatar.

Furthermore, in the technique disclosed in Patent Literature 2, since an image of an individual region in which a delay has occurred is substituted with a previous image, an unnatural image may be obtained in some cases.

An example aspect of the present invention has been made in view of the above problems, and an example object thereof is to provide a technique in which by reducing, as a whole, the amount of information in a VR space which information is to be processed and transmitted, unnaturalness is reduced, and a delay in information processing and information communication is prevented or reduced.

Solution to Problem

An information processing device in accordance with an example aspect of the present invention includes at least one processor, the at least one processor carrying out: an acquisition process for acquiring first spatial information indicating a virtual space in a reference cell serving as a cell in which a user is located in the virtual space, second spatial information indicating the virtual space in one or more peripheral cells which are located around the reference cell, and third spatial information indicating the virtual space in one or more distant cells which are located more distantly from the reference cell than the one or more peripheral cells; and a spatial information process including a first process in which the first spatial information is used, a second process in which the second spatial information is used, and a third process in which the third spatial information is used and which involves a smaller processing load than the second process.

An information processing device in accordance with an example aspect of the present invention includes at least one processor, the at least one processor carrying out: a specification process for specifying a reference cell serving as a cell in which a user is located in a virtual space; and a provision process for providing, to a terminal device, first spatial information indicating the virtual space in the reference cell, second spatial information indicating the virtual space in one or more peripheral cells which are located around the reference cell, and third spatial information indicating the virtual space in one or more distant cells which are located more distantly from the reference cell than the one or more peripheral cells, the second spatial information and the third spatial information being configured such that use of the third spatial information imposes a smaller processing load on the terminal device than use of the second spatial information.

An information processing method in accordance with an example aspect of the present invention is configured such that: at least one processor carries out an acquisition process for acquiring first spatial information indicating a virtual space in a reference cell serving as a cell in which a user is located in the virtual space, second spatial information indicating the virtual space in one or more peripheral cells which are located around the reference cell, and third spatial information indicating the virtual space in one or more distant cells which are located more distantly from the reference cell than the one or more peripheral cells; and the at least one processor carries out a spatial information process for carrying out a first process in which the first spatial information is used, a second process in which the second spatial information is used, and a third process in which the third spatial information is used and which involves a smaller processing load than the second process.

Advantageous Effects of Invention

According to an example aspect of the present invention, by reducing, as a whole, the amount of information in a VR space which information is to be processed and transmitted, it is possible to reduce unnaturalness and prevent or reduce a delay in information processing and information communication.

BRIEF DESCRIPTION OF DRAWINGS

FIG. 3 is a flowchart showing a flow of an information processing method S1 in accordance with the first example embodiment.

FIG. 4 is a block diagram illustrating a configuration of an information processing device 2 in accordance with a second example embodiment of the present invention.

FIG. 7 is a view schematically illustrating a virtual space in which a plurality of users are present.

FIG. 8 is a view schematically illustrating an example of a hierarchical structure of information with which the information processing device 2A provides the information processing device 1A and which is generated in a virtual space VS.

FIG. 9 illustrates an example of an image that the information processing device 1A displays on a display unit.

FIG. 10 is a block diagram illustrating a configuration of an information processing device 1B and an information processing device 2B in accordance with a fourth example embodiment of the present invention.

EXAMPLE EMBODIMENTS

First Example Embodiment

A first example embodiment of the present invention will be described in detail with reference to the drawings. An example embodiment of the present invention is an embodiment serving as basis for example embodiments described later.

(Configuration of Information Processing Device 1)

Figure 1:
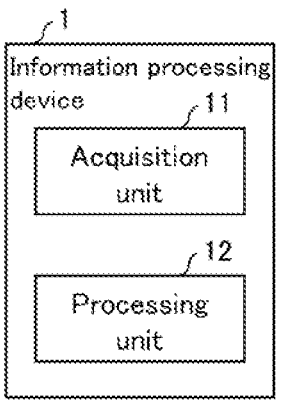
FIG. 1 is a block diagram illustrating a configuration of an information processing device 1 in accordance with a first example embodiment of the present invention.

A configuration of an information processing device 1 in accordance with an example embodiment of the present invention will be described with reference to FIGS. 1 and 2. FIG. 1 is a block diagram illustrating a configuration of the information processing device 1. The information processing device 1 in accordance with the first example embodiment of the present invention is a terminal device used by a user. The terminal device is also referred to as a VR device. The information processing device 1 is a device for allowing the user to participate in a virtual space VS by access by the user to the virtual space VS, the virtual space VS having been constructed by an operation entity thereof or the user and stored on a server. Participation means that the user displays, in the virtual space VS, an avatar representing the user. The information processing device 1 may be, for example, a personal computer, a head-mounted display, or an eyeglass-type display.

Figure 2:
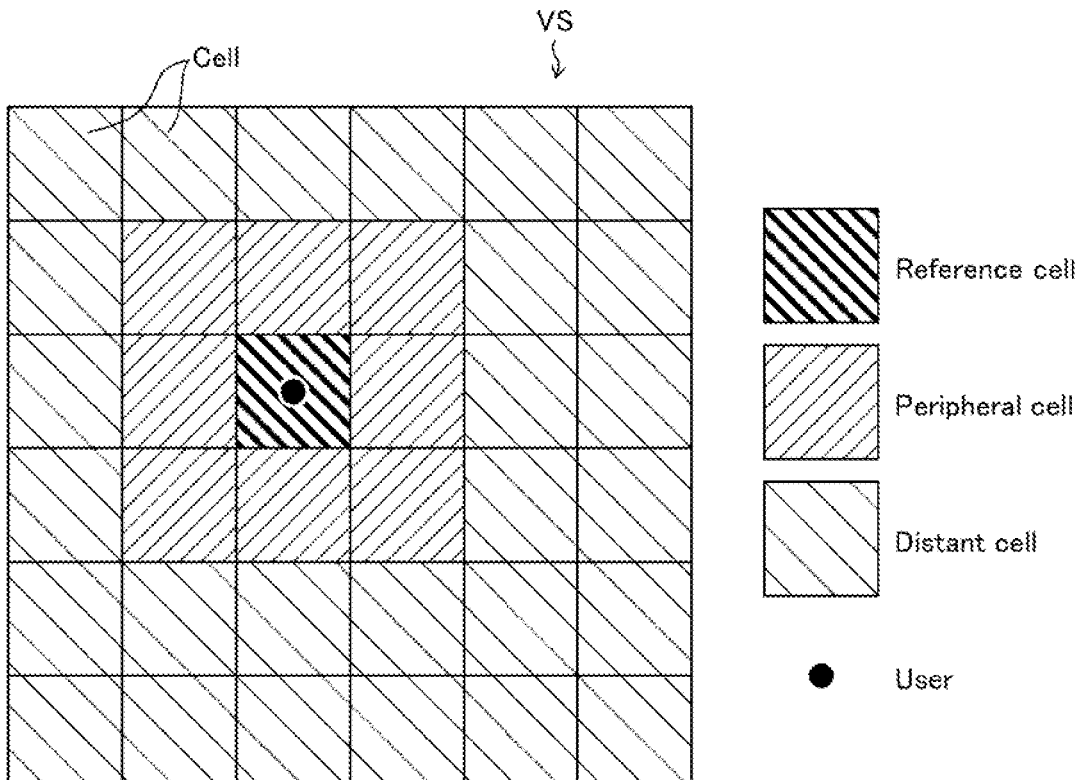
FIG. 2 is a view schematically illustrating an example of an arrangement of cells in a virtual space cell in accordance with the first example embodiment.

FIG. 2 is a cross-sectional view schematically illustrating an example of an arrangement of cells in the virtual space VS. The virtual space VS is a three-dimensional space on a computer, the three-dimensional space being stored in a virtual space server (hereinafter, simply referred to as a "server"). However, FIG. 2 shows a cross-sectional view of a three-dimensional space. In the following description, a constructed virtual space as a whole is referred to as the virtual space VS, and a partial region of the virtual space VS is simply referred to as a "virtual space" with a position thereof specified. As illustrated in FIG. 2, the virtual space VS in accordance with the first example embodiment of the present invention is divided into a plurality of regions.

In the example illustrated in FIG. 2, the three-dimensional virtual space VS is divided into cubes of the same size. However, the three-dimensional virtual space VS may be divided not only into cubes but also into rectangular parallelepipeds or other solid bodies. Furthermore, as described later, such solid bodies may have any dimension. Moreover, not all the solid bodies need to have the same shape. It is possible to divide all the three-dimensional virtual space VS by combining solid shapes having different shapes and different sizes. In the following description, individual spatial regions into which the three-dimensional virtual space VS has been divided are referred to as cells.

As illustrated in FIG. 2, the virtual space VS in accordance with the first example embodiment of the present invention is classified into a reference cell, a peripheral cell, and a distant cell. The reference cell is a cell in which the user is located in the virtual space VS. However, the reference cell may be a region that includes not only the user but also at least one other user. The peripheral cell is a cell that is located around the reference cell. The periphery of the reference cell may be not only a region directly adjacent to the reference cell but also a region adjacent to the peripheral cell that is adjacent to the reference cell. The peripheral cell may be a region that enables some interaction with the user. The distant cell is a cell that is located more distantly from the reference cell than the peripheral cell.

As illustrated in FIG. 1, the information processing device 1 includes an acquisition unit 11 and a processing unit 12. The acquisition unit 11 acquires first spatial information indicating a virtual space in a reference cell, second spatial information indicating the virtual space in one or more peripheral cells, and third spatial information indicating the virtual space in one or more distant cells. Spatial information indicating a virtual space is information indicating an object present in the virtual space and a position of the object. Furthermore, the spatial information may further include information indicating an avatar of a participant and a position of the avatar. The acquisition unit 11 accesses a server so as to acquire the first spatial information, the second spatial information, and the third spatial information.

The processing unit 12 carries out a first process in which the first spatial information is used, a second process in which the second spatial information is used, and a third process in which the third spatial information is used and which involves a smaller processing load than the second process. The first process in which the first spatial information is used is a process for generating an image of an object that is present in a first space, i.e., the reference cell. More specifically, the first process is a process for generating an image of an object in the reference cell which object is visible from a place where the user is located. In the following example embodiments, the user refers to a player who uses the information processing device 1 to participate in the virtual space VS, and at least one other player is referred to as "at least one other user" or a "participant". Furthermore, the user and the at least one other user are sometimes collectively referred to as "participants".

The second process in which the second spatial information is used is a process for generating an image of an object that is present in a second space, i.e., the one or more peripheral cells. More specifically, the second process is a process for generating an image of an object in the one or more peripheral cells which object is visible from the place where the user is located.

The third process in which the third spatial information is used is a process for generating an image of an object that is present in a third space, i.e., the one or more distant cells. More specifically, the third process is a process for generating an image of an object in the one or more distant cells which object is visible from the place where the user is located.

The third process involves a smaller processing load than the second process. More specifically, the processing load of the third process per cell is smaller than the processing load of the second process per cell. For example, an image generated by the third process is a two-dimensional image, and an image generated by the second process is a three-dimensional image. The three-dimensional image is, for example, an image that is displayed on the basis of information including not only the front but also, for example, the side and the back. Thus, in a case where the object rotates, the side and the back thereof are displayed. In contrast, the two-dimensional image is an image that has only information pertaining to the object which is viewed in one direction.

An image that involves a small processing load may be, for example, an image in which a target (model) is represented as a polygon and in which the number of vertices of the polygon has been reduced or in which the number of polygons has been reduced. The image that involves a small processing load may alternatively be an image in which the number of pixels of a surface (texture) of the model has been reduced. The image that involves a small processing load may alternatively be an image in which the amount of information such as a shadow, unevenness, and texture (shader) on the surface of the model has been reduced. The image that involves a small processing load may alternatively be an image in which the amount of information of real-time delineation of light (a light source) has been reduced. Note that the above model may be a two-dimensional model or a three-dimensional model.

For example, the third spatial information may be generated by the server in advance as spatial information that has a small amount of information. Alternatively, the information processing device 1 may reduce the amount of information of the third spatial information acquired from the server. This enables the processing load of the third process to be smaller than the processing load of the second process.

The second process may involve a smaller processing load than the first process. That is, the third process may involve a smaller processing load than the second process, and the second process may involve a smaller processing load than the first process.

The first process may include a process for generating an image of an avatar that is present in the reference cell. The second process may include a process for generating an image of an avatar that is present in the one or more peripheral cells. The third process may include a process for generating an image of an avatar that is present in the one or more distant cells. As viewed from the user, the second space is more distant than the first space, and the third space is more distant than the second space. An object that is located at a distant position looks smaller than a nearby object, and the magnitude and speed of movement thereof are also relatively small. Furthermore, the user is less interested in the object that is located at a distant position. Thus, even in a case the processing load of the second process is made smaller than the processing load of the first process, the user does not feel the image so unnatural.

Some or all of the units of the information processing device 1 may be provided in a distributed manner. Furthermore, some or all of the units of the information processing device 1 may be provided in a cloud. This also applies to the following example embodiments.

(Effect of the Information Processing Device 1)

As described above, the information processing device 1 in accordance with an example embodiment of the present invention employs a configuration including: an acquisition unit 11 that acquires first spatial information indicating a virtual space VS in a reference cell serving as a cell in which a user is located in the virtual space, second spatial information indicating the virtual space in one or more peripheral cells which are located around the reference cell, and third spatial information indicating the virtual space in one or more distant cells which are located more distantly from the reference cell than the one or more peripheral cells; and a processing unit 12 that carries out a first process in which the first spatial information is used, a second process in which the second spatial information is used, and a third process in which the third spatial information is used and which involves a smaller processing load than the second process. Thus, according to the information processing device 1 in accordance with an example embodiment of the present invention, by reducing, as a whole, the amount of information in the virtual space VS which information is to be processed and transmitted, i.e., the processing load, it is possible to obtain an effect of making it possible to reduce unnaturalness and prevent or reduce a delay in information processing and information communication. Furthermore, according to the information processing device 1 in accordance with an example embodiment of the present invention, it is possible to reduce the amount of information per participant which information is to be processed and transmitted. This makes it possible to also obtain an effect of enabling more participants to participate in the virtual space VS.

(Flow of Information Processing Method S1)

A flow of an information processing method S1 in accordance with an example embodiment of the present invention will be described with reference to FIG. 3. FIG. 3 is a flowchart showing a flow of the information processing method S1.

As illustrated in FIG. 3, the information processing method S1 includes a step S11 and a step S12. In the step S11, at least one processor (e.g., the acquisition unit 11) acquires first spatial information indicating a virtual space VS in a reference cell serving as a cell in which a user is located in the virtual space, second spatial information indicating the virtual space in one or more peripheral cells which are located around the reference cell, and third spatial information indicating the virtual space in one or more distant cells which are located more distantly from the reference cell than the one or more peripheral cells. The first spatial information, the second spatial information, and the third spatial information have respective meanings that have been described earlier.

Next, in the step S12, the at least one processor (e.g., the processing unit 12) carries out a first process in which the first spatial information is used, a second process in which the second spatial information is used, and a third process in which the third spatial information is used and which involves a smaller processing load than the second process. The first process, the second process, and the third process have respective meanings that have been described earlier.

(Effect of Information Processing Method S1)

As described above, the information processing method S1 in accordance with an example embodiment of the present invention employs a configuration such that: at least one processor acquires first spatial information indicating a virtual space VS in a reference cell serving as a cell in which a user is located in the virtual space VS, second spatial information indicating the virtual space in one or more peripheral cells which are located around the reference cell, and third spatial information indicating the virtual space in one or more distant cells which are located more distantly from the reference cell than the one or more peripheral cells; and the at least one processor carries out a first process in which the first spatial information is used, a second process in which the second spatial information is used, and a third process in which the third spatial information is used and which involves a smaller processing load than the second process. Thus, according to the information processing method S1 in accordance with an example embodiment of the present invention, by reducing, as a whole, the amount of information in the virtual space VS which information is to be processed and transmitted, it is possible to obtain an effect of making it possible to reduce unnaturalness and prevent or reduce a delay in information processing and information communication. Furthermore, according to the information processing method S1 in accordance with an example embodiment of the present invention, it is possible to reduce the amount of information per participant which information is to be processed and transmitted. This makes it possible to also obtain an effect of enabling more participants to participate in the virtual space VS.

Second Example Embodiment

A second example embodiment of the present invention will be described in detail with reference to the drawings. Note that members having functions identical to those of the respective members described in the first example embodiment are given respective identical reference numerals, and a description of those members is omitted as appropriate.

(Configuration of the Information Processing Device 2)

FIG. 4 is a block diagram illustrating a configuration of an information processing device 2 in accordance with the second example embodiment. The information processing device 2 is, for example, a server that stores a virtual space VS and carries out information communication with a VR device (terminal device) of a participant who participates in the virtual space VS. An example of a configuration of the virtual space VS is similar to the example illustrated in FIG. 2 described in the first example embodiment. As illustrated in FIG. 4, the information processing device 2 includes a specification unit 21 and a provision unit 22. The specification unit 21 and the provision unit 22 are respective embodiments of a specification section and a provision section, which are recited in the Claims.

The specification unit 21 specifies a reference cell serving as a cell in which a user is located in the virtual space VS. The provision unit 22 provides, to a terminal device, first spatial information indicating the virtual space in the reference cell, second spatial information indicating the virtual space in one or more peripheral cells which are located around the reference cell, and third spatial information indicating the virtual space in one or more distant cells which are located more distantly from the reference cell than the one or more peripheral cells. Since details of the reference cell, the one or more peripheral cells, the one or more distant cells, and the first spatial information to the third spatial information each indicating the virtual space in those cells are similar to those described in the first example embodiment, a description thereof is omitted here. Spatial information indicating a virtual space is information indicating an object present in the virtual space and a position of the object. Furthermore, the spatial information may further include information indicating an avatar of a participant and a position of the avatar.

The second spatial information and the third spatial information are configured such that use of the third spatial information imposes a smaller processing load on the terminal device than use of the second spatial information. For example, the second spatial information is three-dimensional spatial information, and the third spatial information is two-dimensional spatial information. Alternatively, the second spatial information may be three-dimensional spatial information, and the third spatial information may be three-dimensional spatial information the amount of which is smaller than the second spatial information.

The process in which the second spatial information is used is also referred to as a second process and refers to a process for generating an image of an object that is present in the one or more peripheral cells. More specifically, the second process is a process for generating an image of an object in the one or more peripheral cells which object is visible from a place where the user is located. A processing load that is imposed on the terminal device of the user with use of the second spatial information is also referred to as a processing load of the second process.

The process in which the third spatial information is used is also referred to as a third process and is a process for generating an image of an object that is present in the one or more distant cells. More specifically, the third process is a process for generating an image of an object in the one or more distant cells which object is visible from the place where the user is located. A processing load that is imposed on the terminal device of the user with use of the third spatial information is also referred to as a processing load of the third process.

In other words, in the terminal device, the processing load of the third process per cell is smaller than the processing load of the second process per cell. For example, an image generated by the third process is a two-dimensional image, and an image generated by the second process is a three-dimensional image. This enables the processing load of the third process to be smaller than the processing load of the second process. Note that an image which is generated by the third process may be a three-dimensional image which involves a lower processing load. An example of an image that involves a small processing load is as have been described in the first example embodiment.

Furthermore, the second process may involve a smaller processing load than the first process in which the first spatial information is used. That is, the third process may involve a smaller processing load than the second process, and the second process may involve a smaller processing load than the first process.

In the terminal device, the first process may include a process for generating an image of an avatar that is present in the reference cell. Similarly, in the terminal device, the second process may include a process for generating an image of an avatar that is present in the one or more peripheral cells, and the third process may include a process for generating an image of an avatar that is present in the one or more distant cells. As viewed from the user, a second space is more distant than a first space, and a third space is more distant than the second space. An object that is located at a distant position looks smaller than a nearby object, and the magnitude and speed of movement thereof are also relatively small. Furthermore, the user is less interested in the object that is located at a distant position. Thus, even in a case the processing load of the second process is made smaller than the processing load of the first process, the user does not feel the image so unnatural.

(Effect of the Information Processing Device 2)

As described above, in an information processing device 2 in accordance with an example embodiment of the present invention, a specification unit 21 specifies a reference cell serving as a cell in which a user is located in a virtual space VS, and a provision unit 22 provides, to a terminal device, first spatial information indicating the virtual space in the reference cell, second spatial information indicating the virtual space in one or more peripheral cells which are located around the reference cell, and third spatial information indicating the virtual space in one or more distant cells which are located more distantly from the reference cell than the one or more peripheral cells. The second spatial information and the third spatial information are configured such that use of the third spatial information imposes a smaller processing load on the terminal device than use of the second spatial information. Thus, according to the information processing device 2 in accordance with an example embodiment of the present invention, by reducing, as a whole, the amount of information to be transmitted by the server and the amount of information in the virtual space VS which information is to be processed in the terminal device of the user, it is possible to obtain an effect of making it possible to reduce unnaturalness and prevent or reduce a delay in information processing and information communication. Furthermore, according to the information processing device 2 in accordance with an example embodiment of the present invention, it is possible to reduce the amount of information per participant which information is to be processed and transmitted. This makes it possible to also obtain an effect of enabling more participants to participate in the virtual space VS.

(Flow of Information Processing Method S2)

A flow of an information processing method S2 in accordance with an example embodiment of the present invention will be described with reference to FIG. 5. FIG. is a flowchart showing a flow of the information processing method S2.

Figure 5:
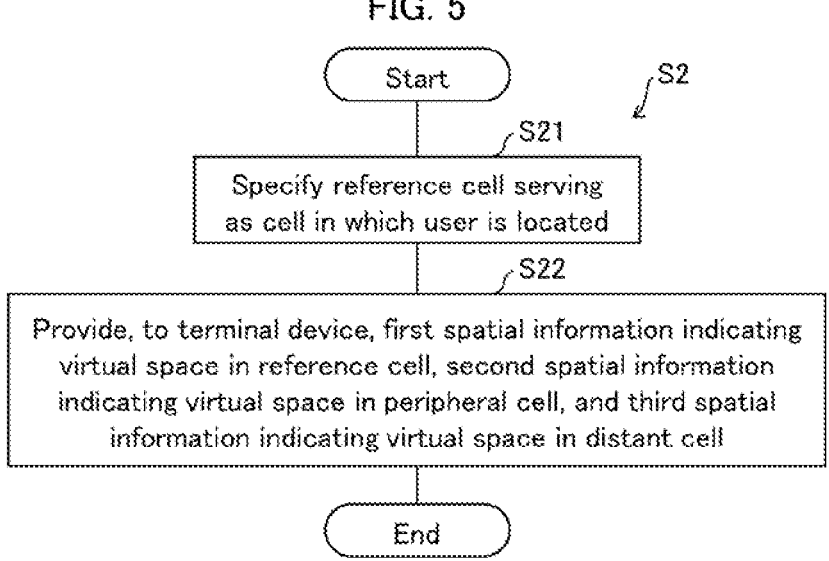
FIG. 5 is a flowchart showing a flow of an information processing method S2 in accordance with the second example embodiment.

As illustrated in FIG. 5, the information processing method S2 includes a step S21 and a step S22. In the step S21, at least one processor (e.g., the specification unit 21) specifies a reference cell serving as a cell in which a user is located in a virtual space VS.

Next, in the step S22, the at least one processor (e.g., the provision unit 22) provides, to a terminal device, first spatial information indicating the virtual space in the reference cell, second spatial information indicating the virtual space in one or more peripheral cells which are located around the reference cell, and third spatial information indicating the virtual space in one or more distant cells which are located more distantly from the reference cell than the one or more peripheral cells.

(Effect of Information Processing Method S2)

As described above, the information processing method S2 in accordance with an example embodiment of the present invention employs a configuration such that: at least one processor specifies a reference cell serving as a cell in which a user is located in a virtual space VS; and the at least one processor provides, to a terminal device, first spatial information indicating the virtual space in the reference cell, second spatial information indicating the virtual space in one or more peripheral cells which are located around the reference cell, and third spatial information indicating the virtual space in one or more distant cells which are located more distantly from the reference cell than the one or more peripheral cells. Thus, according to the information processing method S2 in accordance with an example embodiment of the present invention, by reducing, as a whole, the amount of information to be transmitted by the server and the amount of information in the virtual space VS which information is to be processed in the terminal device of the user, it is possible to obtain an effect of making it possible to reduce unnaturalness and prevent or reduce a delay in information processing and information communication. Furthermore, according to the information processing method S2 in accordance with an example embodiment of the present invention, it is possible to reduce the amount of information per participant which information is to be processed and transmitted. This makes it possible to also obtain an effect of enabling more participants to participate in the virtual space VS.

Third Example Embodiment

A third example embodiment of the present invention will be described in detail with reference to the drawings. Note that members having functions identical to those of the respective members described in the first or second example embodiment are given respective identical reference numerals, and a description of those members is not repeated.

(Configuration of Information Processing Device 2A)

Figure 6:
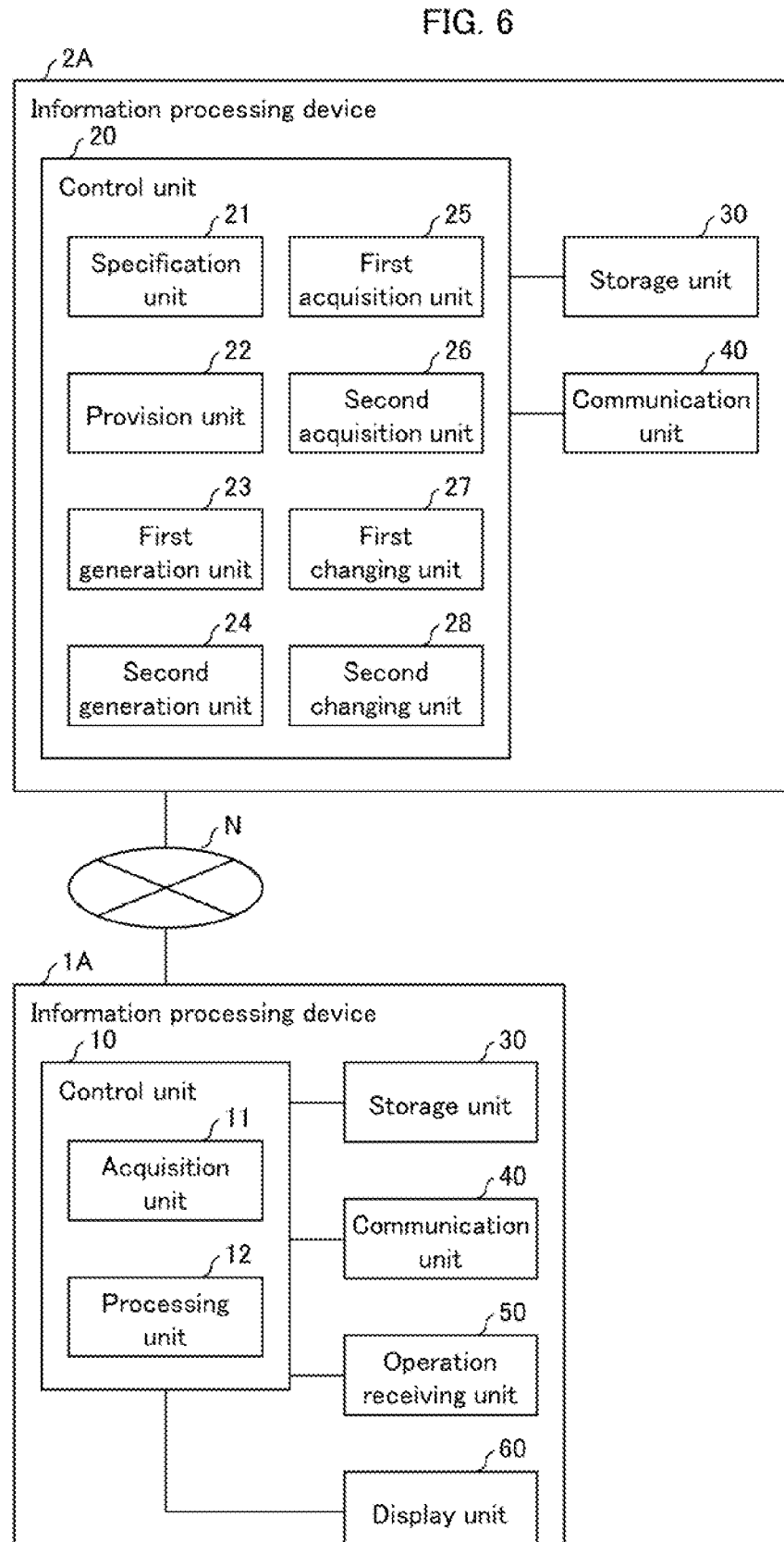
FIG. 6 is a block diagram illustrating a configuration of an information processing device 2A and an information processing device 1A in accordance with a third example embodiment of the present invention.

FIG. 6 is a block diagram illustrating a configuration of an information processing device 2A and an information processing device (terminal device) 1A in accordance with the third example embodiment. The information processing device 2A is, for example, a server that stores a virtual space VS and carries out information communication with a VR device (terminal device) 1A of a participant who participates in the virtual space VS. As illustrated in FIG. 6, the information processing device 2A includes a control unit 20, a storage unit 30, and a communication unit 40. The control unit 20 has a function of collectively controlling the information processing device 2A as a whole. The control unit 20 may include a specification unit 21, a provision unit 22, a first generation unit 23, a second generation unit 24, a first acquisition unit 25, a second acquisition unit 26, a first changing unit 27, and a second changing unit 28. The information processing device 2A and the information processing device 1A that is used by a user are connected via an information communication network N such as the Internet so that information communication is carried out between the information processing device 2A and the information processing device 1A.

At least some of the units of the information processing device 2A may be provided in a distributed manner. Furthermore, some or all of the units of the information processing device 2A may be provided in a cloud.

The storage unit 30 of the information processing device 2A may include, for example, various random access memories (RAMS) and read only memories (ROMs). A ROM stores therein various programs. Functions of the units of the control unit 20 are carried out by at least one processor loading, into a RAM, the various programs stored in the ROM, and executing the various programs. The communication unit 40 carries out information communication with the information processing device 1A.

The specification unit 21 of the control unit 20 specifies a reference cell serving as a cell in which a user is located in a virtual space VS. The provision unit 22 provides, to a terminal device, first spatial information indicating the virtual space in the reference cell, second spatial information indicating the virtual space in one or more peripheral cells which are located around the reference cell, and third spatial information indicating the virtual space in one or more distant cells which are located more distantly from the reference cell than the one or more peripheral cells. A configuration of the second spatial information and the third spatial information such that use of the third spatial information imposes a smaller processing load on the terminal device than use of the second spatial information is similar to the configuration of the information processing device 2 described in the second example embodiment.

In an example embodiment of the present invention, the first spatial information and the second spatial information are each information for generating a stereoscopically visible image. The third spatial information is information for generating an image that includes at least a stereoscopically invisible image.

Note here that the "stereoscopically visible image" refers to an image that is generated on the basis of three-dimensional data, and refers to an image that is configured to enable a user who views the image to recognize that the image represents a three-dimensional object.

For example, the "stereoscopically visible image" that is viewed from a different viewpoint can provide a stereoscopic impression to a user. In a case where a display device that makes it possible to separately present a right-eye image and a left-eye image as in VR goggles is used, the "stereoscopically visible image" may be composed of a right-eye image and a left-eye image that have a parallax therebetween, and may be configured to provide a stereoscopic effect to the user by the parallax.

The "stereoscopically invisible image" may be, for example, an image that is generated on the basis of two-dimensional data. Alternatively, the "stereoscopically invisible image" may be an image that is a combination of template-like two-dimensional images which are prepared in advance. The "stereoscopically invisible image" may alternatively be, for example, an image in which a target (model) is represented as a two-dimensional polygon and in which the number of vertices of the polygon has been reduced or in which the number of polygons has been reduced. The stereoscopically invisible image may alternatively be an image in which the number of pixels of a surface (texture) of the two-dimensional model has been reduced. The stereoscopically invisible image may alternatively be an image in which the amount of information such as a shadow, unevenness, and texture (shader) on the surface of the two-dimensional model has been reduced. The stereoscopically invisible image may alternatively be an image in which the amount of information of real-time delineation of light (a light source) has been reduced.

For example, the first spatial information and the second spatial information each may be three-dimensional spatial information. For example, the second spatial information may be information for generating an image that is more coarse-grained than an image which is generated by the first spatial information. The coarse-grained image is, for example, a low-resolution image. In other words, the coarse-grained image is an image that has a relatively small number of pixels.

For example, the first spatial information to third spatial information may be generated in accordance with the presence or absence of interaction. For example, the first spatial information and the second spatial information may include at least one selected from the group consisting of an avatar of at least one other user with which avatar the user is capable of interaction and an object with which the user is capable of interaction and which is not the avatar. The expression "capable of interaction with the avatar" means "capable of, for example, conversation or contact with the avatar". The expression "capable of interaction with the object" means "capable of, for example, contact or operation with respect to the object". Examples of the object include furniture, home appliances, vehicles, and hand-held tools. Furthermore, the amount of information of the first spatial information and the second spatial information may be changed in accordance with the presence or absence of interaction.

The third spatial information may include neither the avatar of the at least one other user with which avatar the user is capable of interaction nor the object with which the user is capable of interaction. That is, the third spatial information may include only at least one other user or an object with which the user does not interact. The at least one other user or the object with which the user does not interact may be generated as an image including at least a stereoscopically invisible image. This enables the amount of information of the third spatial information to be smaller than the amount of information of the second spatial information.

Alternatively, information pertaining to other users that are present in the one or more distant cells may be displayed as points on a minimap which points are distinguishable and visually recognizable by the user. This enables the user to know how the other users are moving. The minimap is a view showing, in a separate small screen, at which positions in the virtual space VS participants are present. The minimap can be suitably used in a case where the amount of information of the object has been greatly reduced. Furthermore, in a case where at least one other user that is present in the one or more distant cells is speaking, it may be suffice to display a mark indicating that the at least one other user is speaking, instead of displaying details of the speech. Thus, since the user can understand that the at least one other user is doing something, it is possible to reduce a sense of discomfort that the user feels.

With reference back to FIG. 6, the control unit 20 may include the first generation unit 23, the second generation unit 24, the first acquisition unit 25, the second acquisition unit 26, the first changing unit 27, and the second changing unit 28. The first generation unit 23, the second generation unit 24, the first acquisition unit 25, the second acquisition unit 26, the first changing unit 27, and the second changing unit 28 are respective embodiments of a first generation section, a second generation section, a first acquisition section, a second acquisition section, a first changing section, and a second changing section, which are recited in the Claims.

The first generation unit 23 generates the second spatial information from fourth spatial information which indicates the virtual space in the one or more peripheral cells and which involves a greater processing load than the second spatial information. The fourth spatial information may be, for example, spatial information of a space corresponding to the one or more peripheral cells, the spatial information being included in original spatial information of the virtual space which original spatial information has been generated in advance by the information processing device 2A. The first generation unit 23 generates, from the fourth spatial information, the second spatial information that involves a smaller processing load. Alternatively, the fourth spatial information may be, for example, spatial information that a participant has created and uploaded to the information processing device 2A. The first generation unit 23 generates, from the fourth spatial information that is included in the spatial information uploaded by the participant and that is the spatial information of the space corresponding to the one or more peripheral cells, the second spatial information which involves a smaller processing load. A smaller processing load means, for example, a smaller amount of information. For example, the second spatial information is information corresponding to a coarse-grained image.

The second generation unit 24 generates the third spatial information from fifth spatial information which indicates the virtual space in the one or more distant cells and which involves a greater processing load than the third spatial information. The fifth spatial information may be, for example, spatial information of a space corresponding to the one or more distant cells, the spatial information being included in the original spatial information of the virtual space which original spatial information has been generated in advance by the information processing device 2A. The second generation unit 24 generates, from the fifth spatial information, the third spatial information that involves a smaller processing load. Alternatively, the fifth spatial information may be, for example, spatial information that a participant has created and uploaded to the information processing device 2A. The second generation unit 24 generates, from the fifth spatial information that is included in the spatial information uploaded by the participant and that is the spatial information of the space corresponding to the one or more distant cells, the third spatial information which involves a smaller processing load. A smaller processing load means, for example, a smaller amount of information.

For example, the third spatial information is information corresponding to a two-dimensional image.

In the example described earlier, the first generation unit 23 generates the second spatial information from the fourth spatial information and uses the second spatial information to generate a stereoscopically visible image. However, the first generation unit 23 may use the fourth spatial information to directly generate a stereoscopically visible image. The second generation unit 24 generates the third spatial information from the fifth spatial information and uses the third spatial information to generate an image that includes at least a stereoscopically invisible image. However, the second generation unit 24 may use the fifth spatial information to directly generate an image that includes at least a stereoscopically invisible image.

The control unit 20 may include the first acquisition unit 25 and the first changing unit 27. The first acquisition unit 25 acquires information pertaining to movement of the user in the virtual space VS. The first changing unit 27 refers to the information pertaining to the movement acquired by the first acquisition unit 25 and changes at least one selected from the group consisting of a size and a shape of a region defined by the one or more peripheral cells. The information pertaining to the movement of the user is, for example, at least one selected from the group consisting of a movement direction and a movement speed of the user.

Changing the size of the region defined by the one or more peripheral cells means, for example, changing a size of the one or more peripheral cells defining the region. Alternatively, changing the size of the region defined by the peripheral cell may mean changing the number of peripheral cells defining the region. Examples of changing the number of peripheral cells defining the region include increasing the number of peripheral cells by adding, to the one or more peripheral cells, a cell adjacent to a cell that is adjacent to the reference cell.

FIG. 7 is a view schematically illustrating the virtual space VS in which a plurality of users are present. As illustrated in FIG. 7, the virtual space VS is divided into one reference cell in which a user is present, one or more peripheral cells, and one or more distant cells. A region defined by the one or more peripheral cells is referred to as a peripheral region. A region defined by the one or more distant cells is referred to as a distant region. In FIG. 7, a user and a plurality of other users are present. For each of the users (participants), the reference cell and a peripheral cell (peripheral region) thereof are set. In the example illustrated in FIG. 7, the cells are illustrated so as to have the same size and shape. However, the cells need not have the same size and shape.

Assume, for example, that the first acquisition unit 25 acquires information that a user indicated by a double circle (◎) is approaching at least one other user indicated by a black dot (•), as shown by an arrow in FIG. 7. In this case, the first changing unit 27 may increase the peripheral region by also adding, to the one or more peripheral cells, cells that are indicated by thick lines and that are adjacent to a peripheral cell which is indicated by diagonal lines and which is located in a direction of the arrow in which direction the user moves (hereinafter, referred to as a "movement direction").

The movement direction of the user is a direction in which at least one other user in which the user is interested is present. A region in which the user is interested is preferably a stereoscopically visible image with high resolution. Thus, the first changing unit 27 can enlarge a high-resolution region to a wider range by increasing the peripheral region in the movement direction of the user. Even in a case where the peripheral region is enlarged, a high-resolution image that has been once generated can be stored and used. This does not result in an increase in processing load.

The user who moves at a high speed (hereinafter, referred to as a "movement speed") moves, in a short time, to the distant region in which an image has low resolution. Thus, the first changing unit 27 may increase a size of the peripheral region in the movement direction in accordance with the movement speed. By widening the peripheral region with high resolution, it is possible to prevent an immediate reduction in resolution of an image at a destination to which the user moves. Thus, in a case where the first changing unit 27 refers to the information pertaining to the movement and changes at least one selected from the group consisting of the size and the shape of the peripheral region, image unnaturalness to be given to the user can be reduced while the amount of information of the image is reduced.

The first changing unit 27 may divide the peripheral region into multiple stages in accordance with a distance from the user. For example, a peripheral cell in the movement direction is divided into a distance direction. The first changing unit 27 may change, to lower resolution, resolution of an image in a peripheral cell that has been obtained by dividing the peripheral cell in the movement direction and that is at a greater distance from the user. The resolution of the image can be finely changed by changing the resolution for each peripheral cell obtained by the first changing unit 27 having divided the peripheral region into multiple stages. This makes it possible to prevent or reduce a delay in information processing and information communication while further reducing image unnaturalness to be felt by the user.

The first changing unit 27 may cause a difference between (i) at least one selected from the group consisting of the size and the shape of the peripheral region which are set in a case where an object or at least one other user enters the peripheral region from the distant region and (ii) at least one selected from the group consisting of the size and the shape of the peripheral region which are set in a case where the object or the at least one other user exits from the peripheral region to the distant region.

More specifically, the first changing unit 27 may set the peripheral region that is set in a case where the object or the at least one other user moves away from the peripheral region to the distant region to be greater than the peripheral region that is set in a case where the object or the at least one other user moves closer to the peripheral region from the distant region. In a case where the at least one other user or the object with which the user once interacted has moved away, the user may feel unnatural the at least one other user or the object that has entered the distant region and has low resolution. Thus, by setting the peripheral region that is set in a case where the object or the at least one other user moves away from the peripheral region to the distant region to be greater than the peripheral region that is set in a case where the object or the at least one other user moves closer to the peripheral region from the distant region, the object or the at least one other user is prevented from immediately having low resolution. Such a process carried out by the first changing unit 27 makes it possible to reduce a processing load and reduce unnaturalness to be given to the user. Even in a case where the peripheral region is set to be large, an image generated with high resolution can be stored and used. This does not result in an increase in processing load.

The control unit 20 may include the second acquisition unit 26 and the second changing unit 28. The second acquisition unit 26 acquires information pertaining to the number or density of at least one other user in the virtual space VS. The second changing unit 28 refers to the information pertaining to the number or density of participants, the information having been acquired by the second acquisition unit 26, and changes a size of the one or more cells in the virtual space VS.

For example, even in a case where a cell that has a small number or density of at least one other user is in the peripheral region, it is expected that the user will be less interested in such a cell. Thus, the second changing unit 28 may increase a size of a cell at a place where the number or the density of the at least one other user is small. Furthermore, the second changing unit 28 may reduce the amount of information of that cell. This makes it possible to prevent or reduce a delay in information processing and information communication while further reducing image unnaturalness to be felt by the user.

The second acquisition unit 26 may acquire information pertaining to the number or the density of the at least one other user sequentially or regularly. Furthermore, the information processing device 2A may change, in accordance with a processing capacity thereof, a degree of change in size of the one or more cells in response to the number or density of users. Alternatively, the information processing device 2A may be configured such that the user can set or specify such a criterion.

FIG. 8 is a view schematically illustrating an example of a layer (hierarchical) structure of information with which the information processing device 2A provides the information processing device 1A and which is generated in the virtual space VS. The widthwise direction in FIG. 8 indicates a distance from the reference cell. The lengthwise direction in FIG. 8 indicates a plurality of types of an information layer.

As illustrated in FIG. 8, the information layer in the virtual space VS includes, for example, a cell position layer, a peripheral user layer, a peripheral object layer, a background layer, and a spatially ranging layer. These layers may be classified in accordance with a type of an effect to be brought about to the user.

For example, the cell position layer is the information layer that specifies, for example, positions or a distance of a peripheral cell and a background cell with respect to the reference cell, and shapes and sizes of the cells. The peripheral user layer is the information layer that specifies a range in which the user is capable of interaction, i.e., information of at least one other user that is present in the reference cell and a peripheral cell, and details of interaction in those cells. The peripheral object layer is the information layer that (i) reads an object in the reference cell and a peripheral cell with which object the user is capable of interaction and (ii) specifies details of the interaction with the object. The background layer is the information layer that specifies (i) a range in which at least one other user and an object are read as objects in a background, i.e., a distant cell and (ii) details of information pertaining to the at least one other user and the object.

Information processing of information specified in the peripheral user layer, the peripheral object layer, and the background layer is as described above as information processing in the reference cell, the one or more peripheral cells, and the one or more distant cells. Furthermore, the above description has already discussed interaction between the user and the at least one other user or the object. The following description will discuss information specified in the spatially ranging layer and processing of the information.

The spatially ranging layer is an information layer that specifies spatial information accompanied with a processing load that is independent of a distance from the reference cell. Examples of the spatial information accompanied with the processing load that is independent of the distance from the reference cell include (i) information pertaining to an object flying across the cells and (ii) information pertaining to an object that moves across the cells at a high movement speed. The spatial information that thus produces a spatially ranging effect over the virtual space as a whole is also referred to as sixth spatial information.

The provision unit 22 may further provide the information processing device 1A with the above-described information of the spatially ranging layer, i.e., the sixth spatial information accompanied with the processing load that is independent of the distance from the reference cell. The sixth spatial information is information pertaining to an object accompanied with a certain processing load regardless of the distance from the reference cell, i.e., from the user in each of the cells. Thus, a change in processing method for each of the reference cell, the one or more peripheral cells, and the one or more distant cells rather results in an increase in processing load. By providing the information processing device 1A with such information as the sixth spatial information, it is possible to prevent or reduce an increase in processing load in the information processing device 1A.

The information processing device 2A that includes such an information layer structure as described above can carry out predetermined information processing for each of the layers. For example, in peripheral layers (the peripheral user layer and the peripheral object layer), it is possible to generate a stereoscopically visible image with which the user interacts. As described earlier, in the information processing in the peripheral layers, an image may be generated by further classifying the one or more peripheral cells. In the background layer, it is possible to generate an image including at least a stereoscopically invisible image with which the user does not interact. In the spatially ranging layer, an image shared by the cells can be generated. Such a configuration makes it possible to reduce a load of information processing.

By thus carrying out information processing in parallel in the layers, the information processing device 2A can reduce a load of information processing. Furthermore, the information processing device 1A can acquire, in parallel, information from the information processing device 2A, the information being information of a plurality of layers. This enables the information processing device 1A to display an image that is less unnatural.

(Configuration of Information Processing Device 1A)

A configuration of the information processing device (VR device) 1A will be described with reference back to FIG. 6. The information processing device 1A includes a control unit 10, a storage unit 30, a communication unit 40, an operation receiving unit 50, and a display unit 60.

The control unit 10 collectively controls the information processing device 1A as a whole. The control unit 10 includes an acquisition unit 11 and a processing unit 12. The acquisition unit 11 acquires, from the information processing device 2A, information pertaining to the virtual space VS and a participant in the virtual space VS. With reference to the information acquired from the information processing device 2A, the processing unit 12 generates an image and displays the image on the display unit 60.

As in the case of the storage unit 30 of the information processing device 2A, the storage unit 30 includes various memories and stores necessary information. The communication unit 40 carries out information communication with the information processing device 2A. The operation receiving unit 50 receives an operation from a user, converts the operation into an operation signal, and transmits the operation signal to the control unit 10. The control unit 10 transmits, to the information processing device 2A, the operation signal corresponding to the operation of the user. The control unit 10 may also transmit, to the information processing device 2A, spatial information generated by the user.

With the configuration of the information processing device 2A as described above, an image that involves a smaller processing load while being less unnatural is displayed in the information processing device 1A. FIG. 9 is an example of an image that the information processing device 1A displays on the display unit 60. As shown in FIG. 9, at least one other user 902 present in the one or more distant cells has low resolution and is displayed so as to be stereoscopically invisible. At least one other user 903 present in the reference cell or the one or more peripheral cells has higher resolution than the at least one other user 902 present in the one or more distant cells and is displayed so as to be stereoscopically visible. A background 901 of the one or more distant cells, such as buildings and the sky is has low resolution and is displayed so as to be stereoscopically invisible.

The user is not so interested in and does not pay much attention to the background and the at least one other user that are at a distant place. Furthermore, the background and the at least one other user, which are distant, are not felt unnatural even in a case where the background and the at least one other user have low resolution and are not three-dimensional. In contrast, the at least one other user who interacts with the user near the user has high resolution and is stereoscopically visible. Thus, such at least one other user has a sense of reality, and the user can be satisfied. Thus, in a case where the processing load is reduced as a whole by changing the processing load in accordance with various conditions, it is possible to reduce unnaturalness felt by the user and prevent or reduce a delay in information processing and information communication.

(Configuration of Information Processing Device 2A)

As described above, the information processing device 2A in accordance with an example embodiment of the present invention employs a configuration such that the control unit 20 includes the specification unit 21, the provision unit 22, the first generation unit 23, the second generation unit 24, the first acquisition unit 25, and the first changing unit 27. This makes it possible to refer to information pertaining to movement of the user and change at least one selected from the group consisting of the size and the shape of the peripheral region. Thus, an effect of making it possible to more effectively reduce unnaturalness and prevent or reduce a delay in information processing and information communication can be obtained in addition to an effect brought about by the information processing device 2 in accordance with the second example embodiment.

Furthermore, the information processing device 2A in accordance with an example embodiment of the present invention employs a configuration such that the control unit 20 further includes the second acquisition unit 26 and the second changing unit 28. This makes it possible to change the size of the one or more cells in accordance with the number or density of users. Thus, the effect of making it possible to more effectively reduce unnaturalness and prevent or reduce a delay in information processing and information communication can be obtained in addition to the effect brought about by the information processing device 2 in accordance with the second example embodiment.

Fourth Example Embodiment

An information processing device 1B in accordance with a fourth example embodiment of the present invention will be described in detail with reference to the drawings. Note that members having functions identical to those of the respective members described in the first to third example embodiments are given respective identical reference numerals, and a description of those members is not repeated.

(Configuration of Information Processing Device 1B)

Figure 10:
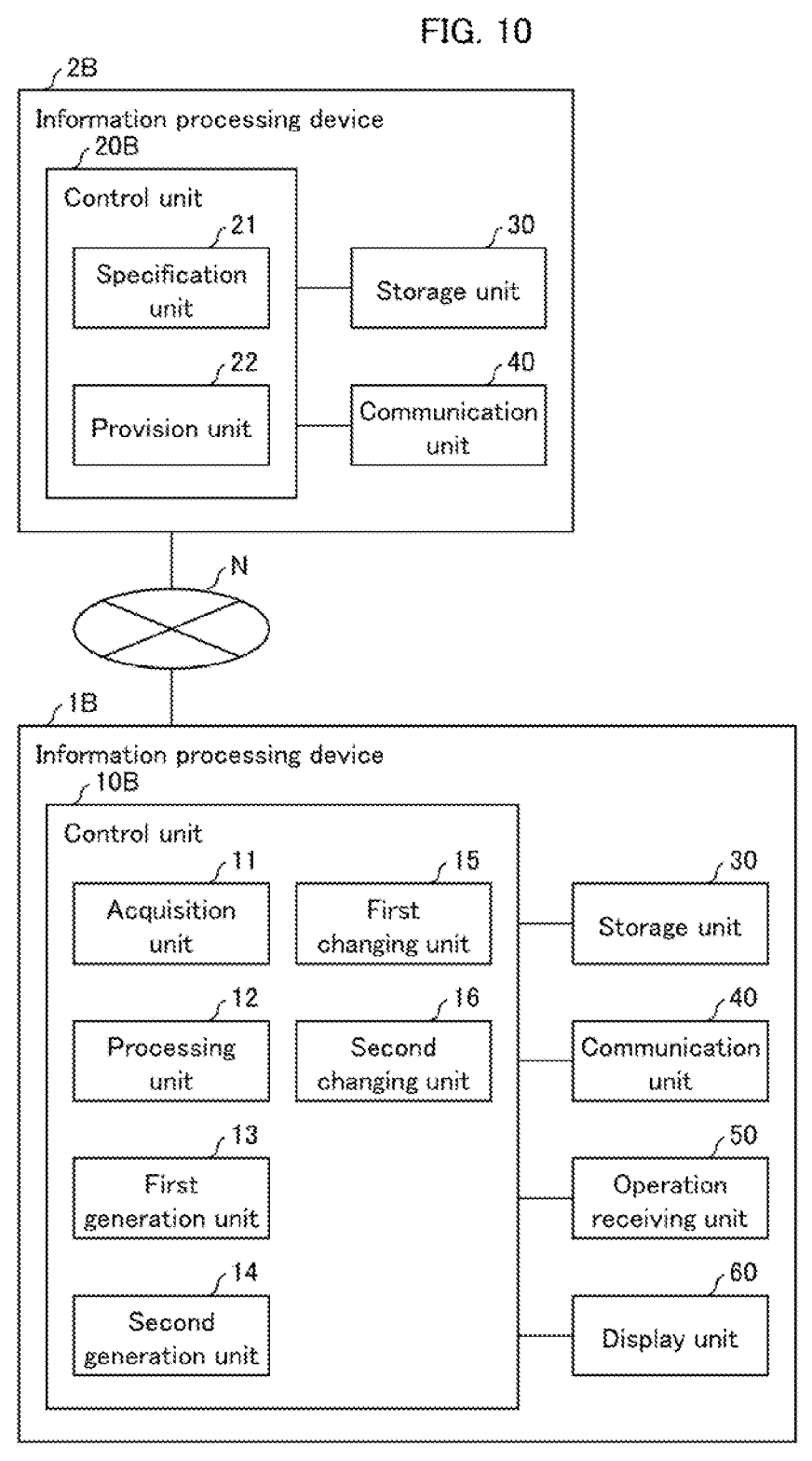

FIG. 10 is a block diagram illustrating a configuration of an information processing device (VR device) 1B serving as a terminal device in accordance with the fourth example embodiment and an information processing device (server) 2B to which the information processing device 1B is connected. The information processing device 1B is a device that a user uses to access and participate in a virtual space VS. For example, the information processing device 2B is a server that generates the virtual space VS on a computer and carries out information communication with the information processing device 1B of a participant who participates in the virtual space VS.

As illustrated in FIG. 10, the information processing device 1B includes a control unit 10B, a storage unit 30, a communication unit 40, an operation receiving unit 50, and a display unit 60. Since the storage unit 30, the communication unit 40, the operation receiving unit 50, and the display unit 60 have functions similar to the functions of the storage unit 30, the communication unit 40, the operation receiving unit 50, and the display unit 60, which have been described in the information processing device 1A in the third example embodiment, a description thereof is omitted here.

The control unit 10B collectively controls the information processing device 1B as a whole. The control unit 10B includes an acquisition unit 11, a processing unit 12, a first generation unit 13, a second generation unit 14, a first changing unit 15, and a second changing unit 16. The first generation unit 13, the second generation unit 14, the first changing unit 15, and the second changing unit 16 are respective embodiments of the first generation section, the second generation section, the first changing section, and the second changing section, which are recited in the Claims.

The acquisition unit 11 acquires first spatial information, second spatial information, and third spatial information from the information processing device 2B. Details of the first spatial information, the second spatial information, and the third spatial information are similar to the details described in the first example embodiment.

The processing unit 12 carries out a first process in which the first spatial information is used, a second process in which the second spatial information is used, and a third process in which the third spatial information is used and which involves a smaller processing load than the second process.

For example, the first process may be a process for generating a first image that is based on the first spatial information and that is a stereoscopically visible image. The second process may be a process for generating a second image that is based on the second spatial information and that is a stereoscopically visible image. The third process may be a process for generating a third image that is based on the third spatial information and that is an image which includes at least a stereoscopically invisible image. The first image that is based on the first spatial information is an image of an object that is visible from a place where the user is located and that is present in a reference cell. The second image that is based on the second spatial information is an image of an object that is visible from the place where the user is located and that is present in one or more peripheral cells. The third image that is based on the third spatial information is an image of an object that is visible from the place where the user is located and that is present in one or more distant cells. The third image includes at least a stereoscopically invisible image, for example. However, this does not limit an example embodiment of the present invention. Details of the "stereoscopically visible image" and the "stereoscopically invisible image" are as have been described in the third example embodiment.

For example, the first image and the second image each may be a three-dimensional image. For example, the processing unit 12 may generate, from the second spatial information, an image that is more coarse-grained than the first image. The coarse-grained image is, for example, a low-resolution image. In other words, the coarse-grained image is an image that has a smaller number of pixels than the image which has not been coarse-grained.

For example, the processing unit 12 may generate the first to third images in accordance with the presence or absence of interaction. For example, the first image and the second image that are generated by the processing unit 12 may include at least one selected from the group consisting of an avatar of at least one other user with which avatar the user is capable of interaction and an object with which the user is capable of interaction and which is not the avatar. The expression "capable of interaction with the avatar" means "capable of, for example, conversation or contact with the avatar". The expression "capable of interaction with the object" means "capable of, for example, contact or operation with respect to the object". Furthermore, the amount of information of the first image and the second image may be changed in accordance with the presence or absence of interaction.

The third image that is generated by the processing unit 12 may include neither the avatar of the at least one other user with which avatar the user is capable of interaction nor the object with which the user is capable of interaction. That is, the third image may include only at least one other user or an object with which the user does not interact. The processing unit 12 may generate, as a stereoscopically invisible image, the at least one other user or the object with which the user does not interact. This enables a smaller processing load to be imposed on generation of the third image than on generation of the second image.

Alternatively, information pertaining to other users that are present in the one or more distant cells may be displayed as points on a minimap which points are distinguishable and visually recognizable by the user. This enables the user to know how the other users are moving. The minimap can be suitably used in a case where the amount of information of the object has been greatly reduced. Furthermore, in a case where at least one other user that is present in the one or more distant cells is speaking, it may be suffice to display a mark indicating that the at least one other user is speaking, instead of displaying details of the speech. Thus, since the user can understand that the at least one other user is doing something, it is possible to reduce a sense of discomfort that the user feels.

The first generation unit 13 may generate the second spatial information from fourth spatial information which indicates the virtual space in the one or more peripheral cells and which involves a greater processing load than the second spatial information. The fourth spatial information may be, for example, spatial information of a space corresponding to the one or more peripheral cells, the spatial information being included in original spatial information of the virtual space which original spatial information the information processing device 1B has acquired from the information processing device 2B. The first generation unit 13 generates, from the fourth spatial information, the second spatial information that involves a smaller processing load. Alternatively, the fourth spatial information may be, for example, spatial information that has been created by the user. The first generation unit 13 generates, from the fourth spatial information that is included in the spatial information created by the user and that is the spatial information of the space corresponding to the one or more peripheral cells, the second spatial information which involves a smaller processing load. A smaller processing load means, for example, a smaller amount of information. For example, the second spatial information is information corresponding to a coarse-grained image.

The second generation unit 14 may generate the third spatial information from fifth spatial information which indicates the virtual space in the one or more distant cells and which involves a greater processing load than the third spatial information. The fifth spatial information may be, for example, spatial information of a space corresponding to the one or more distant cells, the spatial information being included in the original spatial information of the virtual space which original spatial information the information processing device 1B has acquired from the information processing device 2B. The second generation unit 14 generates, from the fifth spatial information, the third spatial information that involves a smaller processing load. Alternatively, the fifth spatial information may be, for example, spatial information that has been created by the user. The second generation unit 14 generates, from the fifth spatial information that is included in the spatial information created by the user and that is the spatial information of the space corresponding to the one or more distant cells, the third spatial information which involves a smaller processing load. A smaller processing load means, for example, a smaller amount of information. For example, the third spatial information is information corresponding to a two-dimensional image.

In the example described earlier, the first generation unit 13 generates the second spatial information from the fourth spatial information, and the processing unit 12 uses the second spatial information to generate a stereoscopically visible image. However, the processing unit 12 may use the fourth spatial information to directly generate a stereoscopically visible image. The second generation unit 14 generates the third spatial information from the fifth spatial information, and the processing unit 12 uses the third spatial information to generate an image that includes at least a stereoscopically invisible image. However, the processing unit 12 may use the fifth spatial information to directly generate an image that includes at least a stereoscopically invisible image.

The acquisition unit 11 may acquire information pertaining to movement of the user in the virtual space VS. In this case, the control unit 10B may include the first changing unit 15. The first changing unit refers to the information pertaining to the movement acquired by the acquisition unit 11 and changes at least one selected from the group consisting of a size and a shape of a region defined by the one or more peripheral cells. The information pertaining to the movement of the user is, for example, at least one selected from the group consisting of a movement direction and a movement speed of the user.

Changing the size of the region defined by the one or more peripheral cells means, for example, changing a size of the one or more peripheral cells defining the region. Alternatively, changing the size of the region defined by the peripheral cell may mean changing the number of peripheral cells defining the region. Examples of changing the number of peripheral cells defining the region include increasing the number of peripheral cells by adding, to the one or more peripheral cells, a cell adjacent to a cell that is adjacent to the reference cell. A region defined by the one or more peripheral cells is referred to as a peripheral region. A region defined by the one or more distant cells is referred to as a distant region.

FIG. 7 described earlier will be used to describe processes executed by the acquisition unit 11 and the first changing unit 15. Assume, for example, that the acquisition unit 11 acquires information that a user indicated by a double circle (◎) is approaching at least one other user indicated by a black dot (•), as shown by the arrow in FIG. 7. In this case, the first changing unit may increase the peripheral region by also adding, to the one or more peripheral cells, cells that are indicated by thick lines and that are adjacent to a peripheral cell which is indicated by diagonal lines and which is located in a movement direction of the arrow in which direction the user moves.

The movement direction of the user is a direction in which at least one other user in which the user is interested is present. A region in which the user is interested is preferably a stereoscopically visible image with high resolution. Thus, the first changing unit 15 can enlarge a high-resolution region to a wider range by increasing the peripheral region in the movement direction of the user. Even in a case where the peripheral region is enlarged, a high-resolution image that has been once generated can be stored and used. This does not result in an increase in processing load.

The user who moves at a high movement speed moves, in a short time, to the distant region in which an image has low resolution. Thus, the first changing unit 15 may increase a size of the peripheral region in the movement direction in accordance with the movement speed. By widening the peripheral region with high resolution, it is possible to prevent an immediate reduction in resolution of an image at a destination to which the user moves. Thus, in a case where the first changing unit 15 refers to the information pertaining to the movement and changes at least one selected from the group consisting of the size and the shape of the peripheral region, image unnaturalness to be given to the user can be reduced while the amount of information of the image is reduced.

The first changing unit 15 may divide the peripheral region into multiple stages in accordance with a distance from the user. For example, a peripheral cell in the movement direction is divided into a distance direction. The first changing unit 15 may change, to lower resolution, resolution of an image in a peripheral cell that has been obtained by dividing the peripheral cell in the movement direction and that is at a greater distance from the user. The resolution of the image can be finely changed by changing the resolution for each peripheral cell obtained by the first changing unit 15 having divided the peripheral region into multiple stages. This makes it possible to prevent or reduce a delay in information processing and information communication while further reducing image unnaturalness to be felt by the user.

The first changing unit 15 may cause a difference between (i) at least one selected from the group consisting of the size and the shape of the peripheral region which are set in a case where an object or at least one other user enters the peripheral region from the distant region and (ii) at least one selected from the group consisting of the size and the shape of the peripheral region which are set in a case where the object or the at least one other user exits from the peripheral region to the distant region.

More specifically, the first changing unit 15 may set the peripheral region that is set in a case where the object or the at least one other user moves away from the peripheral region to the distant region to be greater than the peripheral region that is set in a case where the object or the at least one other user moves closer to the peripheral region from the distant region. In a case where the at least one other user or the object with which the user once interacted has moved away, the user may feel unnatural the at least one other user or the object that has entered the distant region and has low resolution. Thus, by setting the peripheral region that is set in a case where the object or the at least one other user moves away from the peripheral region to the distant region to be greater than the peripheral region that is set in a case where the object or the at least one other user moves closer to the peripheral region from the distant region, the object or the at least one other user is prevented from immediately having low resolution. Such a process carried out by the first changing unit 15 makes it possible to reduce a processing load and reduce unnaturalness to be given to the user. Even in a case where the peripheral region is set to be large, an image generated with high resolution can be stored and used. This does not result in an increase in processing load.

The acquisition unit 11 may further acquire information pertaining to the number or density of at least one other user in the virtual space VS. In this case, the control unit 10B may include the second changing unit 16. The second changing unit 16 refers to the information pertaining to the number or the density of the at least one other user and changes a size of the one or more cells in the virtual space VS.

For example, even in a case where a cell that has a small number or density of at least one other user is in the peripheral region, it is expected that the user will be less interested in such a cell. Thus, the second changing unit 16 may increase a size of a cell at a place where the number or the density of the at least one other user is small. Furthermore, the second changing unit 16 may reduce the amount of information of that cell. This makes it possible to prevent or reduce a delay in information processing and information communication while further reducing image unnaturalness to be felt by the user.

The acquisition unit 11 may acquire information pertaining to the number or the density of the at least one other user sequentially or regularly. Furthermore, the information processing device 1B may change, in accordance with a processing capacity thereof, a degree of change in size of the one or more cells in response to the number or density of users. Alternatively, the information processing device 1B may be configured such that the user can set or specify such a criterion.

FIG. 8 is a view schematically illustrating a layer (hierarchical) structure of information with which the information processing device 2B provides the information processing device 1B and which is generated in the virtual space VS. Since details of this layer structure and an effect thereof are as have been described in the third example embodiment, a description thereof is omitted here.

The spatially ranging layer is an information layer that specifies spatial information accompanied with a processing load that is independent of a distance from the reference cell. The acquisition unit 11 may further acquire, from the information processing device 2B, the above-described information of the spatially ranging layer, i.e., the sixth spatial information accompanied with the processing load that is independent of the distance from the reference cell. The sixth spatial information is information pertaining to an object accompanied with a certain processing load regardless of the distance from the reference cell, i.e., from the user in each of the cells. Thus, a change in processing method for each of the reference cell, the one or more peripheral cells, and the one or more distant cells rather results in an increase in processing load. In a case where the acquisition unit 11 acquires such information as the sixth spatial information from the information processing device 2B, it is possible to prevent or reduce an increase in processing load in the information processing device 1B.

The information processing device 1B that acquires information which has such a layer structure as described above can carry out predetermined information processing for each of the layers. For example, in peripheral layers (the peripheral user layer and the peripheral object layer), it is possible to generate a stereoscopically visible image with which the user interacts. As described earlier, in the information processing in the peripheral layers, an image may be generated by further classifying the one or more peripheral cells. In the background layer, it is possible to generate an image including at least a stereoscopically invisible image with which the user does not interact. In the spatially ranging layer, an image shared by the cells can be generated. Such a configuration enables the information processing device 1B to reduce a load of information processing and display an image that is less unnatural.

(Configuration of Information Processing Device 2B)

A configuration of the information processing device 2B serving as the server will be described with reference back to FIG. 10. The information processing device 2B includes a control unit 20B, the storage unit 30, and the communication unit 40. A configuration of the storage unit 30 and the communication unit 40 are as have been described in the third example embodiment.

The control unit 20B collectively controls the information processing device 2B as a whole. The control unit 20B includes a specification unit 21 and a provision unit 22. The specification unit 21 specifies a reference cell serving as a cell in which a user is located in a virtual space. The provision unit 22 provides the information processing device 1B with the first spatial information, the second spatial information, and the third spatial information. The information processing device 1B can generate an image the processing load of which has been reduced by using the first spatial information, the second spatial information, and the third spatial information, which have been acquired from the information processing device 2B, to carry out the above-described various processes, and display the image on the display unit 60.

FIG. 9 illustrates an example of an image that the information processing device 1B generates and displays. The feature of FIG. 9 is as have been described in the third example embodiment. The user is not so interested in and does not pay much attention to the background and the at least one other user that are at a distant place. Furthermore, the background and the at least one other user, which are distant, are not felt unnatural even in a case where the background and the at least one other user have low resolution and are not three-dimensional. In contrast, the at least one other user who interacts with the user near the user has high resolution and is stereoscopically visible. Thus, such at least one other user has a sense of reality, and the user can be satisfied. Thus, the information processing device 1B that reduces the processing load as a whole by changing the processing load in accordance with various conditions can reduce unnaturalness felt by the user and prevent or reduce a delay in information processing and information communication.

(Effect of Information Processing Device 1B)

As described above, the information processing device 1B in accordance with an example embodiment of the present invention employs a configuration such that the control unit 10B includes the acquisition unit 11, the processing unit 12, the first generation unit 13, the second generation unit 14, and the first changing unit 15. This makes it possible to refer to information pertaining to movement of the user and change at least one selected from the group consisting of the size and the shape of the peripheral region. Thus, an effect of making it possible to more effectively reduce unnaturalness and prevent or reduce a delay in information processing and information communication can be obtained in addition to an effect brought about by the information processing device 1 in accordance with the first example embodiment.

Furthermore, the information processing device 1B in accordance with an example embodiment of the present invention employs a configuration such that the control unit 10B further includes the second changing unit 16. This makes it possible to change the size of the one or more cells in accordance with the number or density of users. Thus, the effect of making it possible to more effectively reduce unnaturalness and prevent or reduce a delay in information processing and information communication can be obtained in addition to the effect brought about by the information processing device 1 in accordance with the first example embodiment.

[Software Implementation Example]

Some or all of functions of the information processing device 1, 1A, 1B, 2, 2A, 2B (hereinafter, referred to as an "information processing device 1 or the like") can be realized by hardware provided in an integrated circuit (IC chip) or the like or can be alternatively realized by software.

Figure 11:
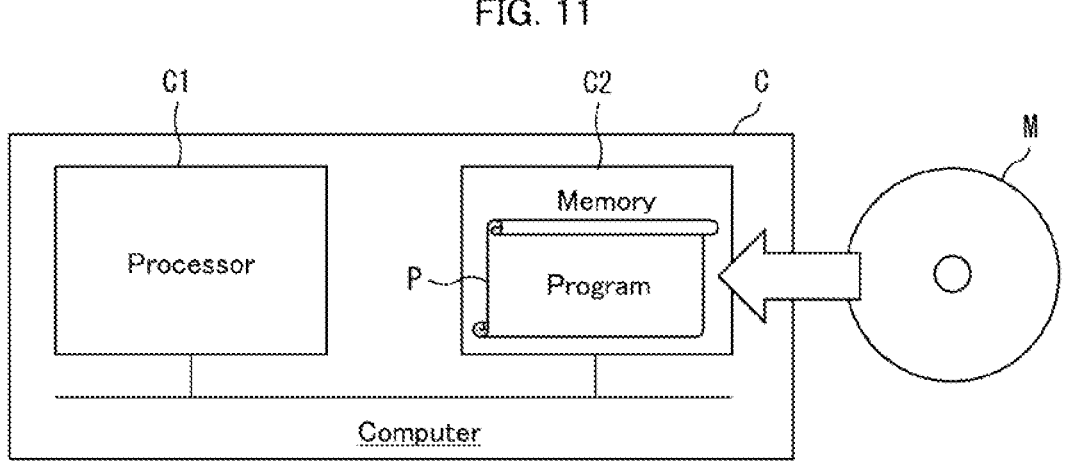
FIG. 11 is a configuration diagram for achieving an information processing device by software.

In the latter case, the information processing device 1 or the like is realized by, for example, a computer that executes instructions of a program that is software realizing the foregoing functions. FIG. 11 illustrates an example of such a computer (hereinafter referred to as a "computer C"). The computer C includes at least one processor C1 and at least one memory C2. The at least one memory C2 stores a program P for causing the computer C to operate as the information processing device 1 or the like. In the computer C, the at least one processor C1 reads and executes the program P stored in the at least one memory C2, so that the functions of the information processing device 1 or the like are realized.

Examples of the at least one processor C1 encompass a central processing unit (CPU), a graphic processing unit (GPU), a digital signal processor (DSP), a micro processing unit (MPU), an floating point number processing unit (FPU), a physics processing unit (PPU), a microcontroller, and a combination thereof. Examples of the at least one memory C2 encompass a flash memory, a hard disk drive (HDD), a solid state drive (SSD), and a combination thereof.

Note that the computer C may further include a random access memory (RAM) in which the program P is to be loaded while being executed and in which various kinds of data are to be temporarily stored. The computer C may further include a communication interface through which data is to be transmitted and received between the computer C and at least one other device. The computer C may further include an input/output interface through which an input/output device(s) such as a keyboard, a mouse, a display and/or a printer is/are to be connected to the computer C.

The program P can be recorded in a non-transitory, tangible storage medium M capable of being read by the computer C. Examples of such a storage medium M encompass a tape, a disk, a card, a semiconductor memory, and a programmable logic circuit. The computer C can acquire the program P via the storage medium M. The program P can alternatively be transmitted via a transmission medium. Such a transmission medium encompasses a communication network and broadcast wave. The computer C can also acquire the program P via the transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

The whole or part of the example embodiments disclosed above can be described as, but not limited to, the following supplementary notes.

Supplementary Note 1

An information processing device including: an acquisition section that acquires first spatial information indicating a virtual space in a reference cell serving as a cell in which a user is located in the virtual space, second spatial information indicating the virtual space in one or more peripheral cells which are located around the reference cell, and third spatial information indicating the virtual space in one or more distant cells which are located more distantly from the reference cell than the one or more peripheral cells; and a processing section that carries out a first process in which the first spatial information is used, a second process in which the second spatial information is used, and a third process in which the third spatial information is used and which involves a smaller processing load than the second process.

According to the configuration, by reducing, as a whole, the amount of information in a VR space which information is to be processed and transmitted, it is possible to reduce unnaturalness and prevent or reduce a delay in information processing and information communication.

Supplementary Note 2

The Information Processing Device According to Supplementary note 1, wherein the processing section generates, as the first process, a first image that is based on the first spatial information and that is a stereoscopically visible image, generates, as the second process, a second image that is based on the second spatial information and that is a stereoscopically visible image, and generates, as the third process, a third image that is based on the third spatial information and that is an image which includes at least a stereoscopically invisible image.

According to the configuration, by generating an image that includes at least a stereoscopically invisible image, the amount of information in the VR space which information is to be processed and transmitted can be reduced as a whole.

Supplementary Note 3

The information processing device according to Supplementary note 2, wherein the processing section generates, from the second spatial information, an image that is more coarse-grained than the first image.

According to the configuration, by generating an image that is more coarse-grained than the first image, the amount of information in the VR space which information is to be processed and transmitted can be reduced as a whole.

Supplementary Note 4

The information processing device according to Supplementary note 2 or 3, wherein the first image and the second image include at least one selected from the group consisting of an avatar of at least one other user with which avatar the user is capable of interaction and an object with which the user is capable of interaction and which is not the avatar.

The configuration enables the avatar or the object of the first image and the second image to be capable of interaction with the user.

Supplementary note 5

The information processing device according to any one of Supplementary notes 2 to 4, wherein the third image includes neither an avatar of at least one other user with which avatar the user is capable of interaction nor an object with which the user is capable of interaction.

The configuration makes it possible to reduce the amount of information of the third image.

Supplementary Note 6

The information processing device according to any one of Supplementary notes 1 to 5, further including a first generation section that generates the second spatial information from fourth spatial information which indicates the virtual space in the one or more peripheral cells and which involves a greater processing load than the second spatial information.

The configuration enables the second spatial information that involves a small processing load to be generated from the fourth spatial information that involves a great processing load.

Supplementary Note 7

The information processing device according to any one of Supplementary notes 1 to 6, further including a second generation section that generates the third spatial information from fifth spatial information which indicates the virtual space in the one or more distant cells and which involves a greater processing load than the third spatial information.

The configuration enables the third spatial information that involves a small processing load to be generated from the fifth spatial information that involves a great processing load.

Supplementary note 8

The information processing device according to any one of Supplementary notes 1 to 7, wherein the acquisition section acquires information pertaining to movement of the user in the virtual space, the information processing device further including a first changing section that refers to the information pertaining to the movement and changes at least one selected from the group consisting of a size and a shape of a region defined by the one or more peripheral cells.

The configuration makes it possible to refer to information pertaining to movement and generate an image the unnaturalness of which has been more effectively reduced and which has a smaller amount of information.

Supplementary Note 9

The information processing device according to any one of Supplementary notes 1 to 8, wherein the acquisition section further acquires information pertaining to the number or density of at least one other user in the virtual space, the information processing device further including a second changing section that refers to the information pertaining to the number or the density of the at least one other user and changes a size of the one or more cells in the virtual space.

The configuration makes it possible to refer to information pertaining to the number or density of the at least one other user and generate an image the unnaturalness of which has been more effectively reduced and which has a smaller amount of information.

Supplementary Note 10

The information processing device according to any one of Supplementary notes 1 to 9, wherein the acquisition section further acquires sixth spatial information accompanied with a processing load that is independent of a distance from the reference cell, and the processing section carries out a process in which the sixth spatial information is used.

The configuration makes it possible to generate an object or an image of an avatar, the object or the image being used in the virtual space as a whole.

Supplementary Note 11

An information processing device including: a specification section that specifies a reference cell serving as a cell in which a user is located in a virtual space; and a provision section that provides, to a terminal device, first spatial information indicating the virtual space in the reference cell, second spatial information indicating the virtual space in one or more peripheral cells which are located around the reference cell, and third spatial information indicating the virtual space in one or more distant cells which are located more distantly from the reference cell than the one or more peripheral cells, the second spatial information and the third spatial information being configured such that use of the third spatial information imposes a smaller processing load on the terminal device than use of the second spatial information.

The configuration makes it possible to obtain an effect similar to the effect of Supplementary note 1.

Supplementary Note 12

The information processing device according to Supplementary note 11, wherein the first spatial information and the second spatial information are each information for generating a stereoscopically visible image, and the third spatial information is information for generating an image that includes at least a stereoscopically invisible image.

The configuration makes it possible to obtain an effect similar to the effect of Supplementary note 2.

Supplementary Note 13

The information processing device according to Supplementary note 11 or 12, wherein the second spatial information is information for generating an image that is more coarse-grained than an image which is generated by the first spatial information.

The configuration makes it possible to obtain an effect similar to the effect of Supplementary note 3.

Supplementary Note 14

The information processing device according to any one of Supplementary notes 11 to 13, wherein the first spatial information and the second spatial information include at least one selected from the group consisting of an avatar of at least one other user with which avatar the user is capable of interaction and an object with which the user is capable of interaction and which is not the avatar.

The configuration makes it possible to obtain an effect similar to the effect of Supplementary note 4.

Supplementary Note 15

The information processing device according to any one of Supplementary notes 11 to 14, wherein the third spatial information includes neither an avatar of at least one other user with which avatar the user is capable of interaction nor an object with which the user is capable of interaction.

The configuration makes it possible to obtain an effect similar to the effect of Supplementary note 5.

Supplementary Note 16

The information processing device according to any one of Supplementary notes 11 to 15, further including a first generation section that generates the second spatial information from fourth spatial information which indicates the virtual space in the one or more peripheral cells and which involves a greater processing load than the second spatial information.

The configuration makes it possible to obtain an effect similar to the effect of Supplementary note 6.

Supplementary Note 17

The information processing device according to any one of Supplementary notes 11 to 16, further including a second generation section that generates the third spatial information from fifth spatial information which indicates the virtual space in the one or more distant cells and which involves a greater processing load than the third spatial information.

The configuration makes it possible to obtain an effect similar to the effect of Supplementary note 7.

Supplementary Note 18

The information processing device according to any one of Supplementary notes 11 to 17, further including: a first acquisition section that acquires information pertaining to movement of the user in the virtual space; and a first changing section that refers to the information pertaining to the movement and changes at least one selected from the group consisting of a size and a shape of a region defined by the one or more peripheral cells.

The configuration makes it possible to obtain an effect similar to the effect of Supplementary note 8.

Supplementary Note 19

The information processing device according to any one of Supplementary notes 11 to 18, further including: a second acquisition section that acquires information pertaining to the number or density of at least one other user in the virtual space; and a second changing section that refers to the information pertaining to the number or the density of the at least one other user and changes a size of the one or more cells in the virtual space.

The configuration makes it possible to obtain an effect similar to the effect of Supplementary note 9.

Supplementary Note 20

The information processing device according to any one of Supplementary notes 11 to 19, wherein the provision section further provides sixth spatial information accompanied with a processing load that is independent of a distance from the reference cell.

The configuration makes it possible to obtain an effect similar to the effect of Supplementary note 10.

Supplementary Note 21

An information processing method wherein: at least one processor acquires first spatial information indicating a virtual space in a reference cell serving as a cell in which a user is located in the virtual space, second spatial information indicating the virtual space in one or more peripheral cells which are located around the reference cell, and third spatial information indicating the virtual space in one or more distant cells which are located more distantly from the reference cell than the one or more peripheral cells; and the at least one processor carries out a first process in which the first spatial information is used, a second process in which the second spatial information is used, and a third process in which the third spatial information is used and which involves a smaller processing load than the second process.

The configuration makes it possible to obtain an effect similar to the effect of Supplementary note 1.

Supplementary Note 22

An information processing method wherein: at least one processor specifies a reference cell serving as a cell in which a user is located in a virtual space; and the at least one processor provides, to a terminal device, first spatial information indicating the virtual space in the reference cell, second spatial information indicating the virtual space in one or more peripheral cells which are located around the reference cell, and third spatial information indicating the virtual space in one or more distant cells which are located more distantly from the reference cell than the one or more peripheral cells, the second spatial information and the third spatial information being configured such that use of the third spatial information imposes a smaller processing load on the terminal device than use of the second spatial information.

The configuration makes it possible to obtain an effect similar to the effect of Supplementary note 1.

Supplementary Note 23

A program for causing a computer to carry out: a process for acquiring first spatial information indicating a virtual space in a reference cell serving as a cell in which a user is located in the virtual space, second spatial information indicating the virtual space in one or more peripheral cells which are located around the reference cell, and third spatial information indicating the virtual space in one or more distant cells which are located more distantly from the reference cell than the one or more peripheral cells; and a process for carrying out a first process in which the first spatial information is used, a second process in which the second spatial information is used, and a third process in which the third spatial information is used and which involves a smaller processing load than the second process.

The configuration makes it possible to obtain an effect similar to the effect of Supplementary note 1.

Supplementary Note 24

A program causing a computer to carry out: a process for specifying a reference cell serving as a cell in which a user is located in a virtual space; and a process for providing, to a terminal device, first spatial information indicating the virtual space in the reference cell, second spatial information indicating the virtual space in one or more peripheral cells which are located around the reference cell, and third spatial information indicating the virtual space in one or more distant cells which are located more distantly from the reference cell than the one or more peripheral cells, the second spatial information and the third spatial information being configured such that use of the third spatial information imposes a smaller processing load on the terminal device than use of the second spatial information.

The configuration makes it possible to obtain an effect similar to the effect of Supplementary note 1.

Supplementary Note 25

An information processing device including at least one processor, the at least one processor carrying out: an acquisition process for acquiring first spatial information indicating a virtual space in a reference cell serving as a cell in which a user is located in the virtual space, second spatial information indicating the virtual space in one or more peripheral cells which are located around the reference cell, and third spatial information indicating the virtual space in one or more distant cells which are located more distantly from the reference cell than the one or more peripheral cells; and an execution process for carrying out a first process in which the first spatial information is used, a second process in which the second spatial information is used, and a third process in which the third spatial information is used and which involves a smaller processing load than the second process.

Note that the information processing device may further include a memory, which may store a program for causing the at least one processor to carry out the acquisition process and the execution process. Furthermore, the program may be recorded in a non-transitory, tangible computer-readable storage medium.

Supplementary Note 26

An information processing device including at least one processor, the at least one processor carrying out: a specification process for specifying a reference cell serving as a cell in which a user is located in a virtual space; and a provision process for providing, to a terminal device, first spatial information indicating the virtual space in the reference cell, second spatial information indicating the virtual space in one or more peripheral cells which are located around the reference cell, and third spatial information indicating the virtual space in one or more distant cells which are located more distantly from the reference cell than the one or more peripheral cells, the second spatial information and the third spatial information being configured such that use of the third spatial information imposes a smaller processing load on the terminal device than use of the second spatial information.

Note that the information processing device may further include a memory, which may store a program for causing the at least one processor to carry out the specification process and the provision process. Furthermore, the program may be recorded in a non-transitory, tangible computer-readable storage medium.

REFERENCE SIGNS LIST

1, 1A, 1B, 2, 2A, 2B . . . Information processing device
11 . . . Acquisition unit
12 . . . Processing unit
13, 23 . . . First generation unit
14, 24 . . . Second generation unit
15, 27 . . . First changing unit
16, 28 . . . Second changing unit
10, 10B, 20, 20B . . . Control unit
21 . . . Specification unit
22 . . . Provision unit
25 . . . First acquisition unit
26 . . . Second acquisition unit
30 . . . Storage unit
40 . . . Communication unit
50 . . . Operation receiving unit
60 . . . Display unit

The invention claimed is:
1. An information processing device comprising:
at least one memory configured to store instructions; and
at least one processor configured to execute the instructions to execute:
an acquisition process for acquiring second spatial information indicating a virtual space in one or more peripheral cells which are located around a reference cell serving as a cell in which a user is located in the virtual space, third spatial information indicating the virtual space in one or more distant cells which are located more distantly from the reference cell than the one or more peripheral cells, and sixth spatial information indicated at resolution independent of a distance from the reference cell; and a displaying process for displaying an image in which the third spatial information is used at a lower resolution than that of an image in which the second spatial information is used.

2. The information processing device according to claim 1, wherein the at least one processor is further configured to execute the instructions to:

in the acquisition process, further acquire first spatial information indicating the virtual space in the reference cell; and further carry out a spatial information process for carrying out a first process in which the first spatial information is used, a second process in which the second spatial information is used, and a third process in which the third spatial information at a lower resolution than that of the second spatial information is used, wherein the spatial information process is a process for:

generating, as the first process, a first image that is based on the first spatial information and that is a stereoscopically visible image, generating, as the second process, a second image that is based on the second spatial information and that is a stereoscopically visible image, and generating, as the third process, a third image that is based on the third spatial information and that is an image which includes at least a stereoscopically invisible image.

3. The information processing device according to claim 2, wherein the spatial information process is a process for generating, from the second spatial information, an image that is more coarse-grained than the first image.

4. The information processing device according to claim 2, wherein the first image and the second image include at least one selected from the group consisting of an avatar of at least one other user with which avatar the user is capable of interaction and an object with which the user is capable of interaction and which is not the avatar.

5. The information processing device according to claim 2, wherein the third image includes neither an avatar of at least one other user with which avatar the user is capable of interaction nor an object with which the user is capable of interaction.

6. The information processing device according to claim 1, wherein the at least one processor further carries out a first generation process for generating the second spatial information from fourth spatial information which indicates the virtual space in the one or more peripheral cells and which provides higher image resolution than the second spatial information.

7. The information processing device according to claim 1, wherein the at least one processor further carries out a second generation process for generating the third spatial information from fifth spatial information which indicates the virtual space in the one or more distant cells and which involves a greater processing load than the third spatial information.

8. The information processing device according to claim 1, wherein the acquisition process is a process for acquiring information pertaining to movement of the user in the virtual space, and the at least one processor further carries out a first changing process for referring to the information pertaining to the movement and changing at least one selected from the group consisting of a size and a shape of a region defined by the one or more peripheral cells.

9. The information processing device according to claim 1, wherein the acquisition process is a process for further acquiring information pertaining to the number or density of at least one other user in the virtual space, and the at least one processor further carries out a second changing process for referring to the information pertaining to the number or the density of the at least one other user and changing a size of the one or more cells in the virtual space.

10. An information processing device comprising at least one processor, the at least one processor configured to execute:

a specification process for specifying a reference cell serving as a cell in which a user is located in a virtual space; and a provision process for providing, to a terminal device, second spatial information indicating the virtual space in one or more peripheral cells which are located around the reference cell, third spatial information indicating the virtual space in one or more distant cells which are located more distantly from the reference cell than the one or more peripheral cells, and sixth spatial information indicated at resolution independent of a distance from the reference cell, wherein the at least one processor is further configured to, in the provision process, provide the third spatial information for generating an image at a lower resolution than that of an image in which the second spatial information is used.

11. The information processing device according to claim 10, wherein the at least one processor is further configured to, in the provision process, further provide first spatial information indicating the virtual space in the reference cell, the second spatial information and the third spatial information are configured such that an image in which the third spatial information is used in the terminal device has a lower resolution than that of an image in which the second spatial information is used in the terminal device, the first spatial information and the second spatial information are each information for generating a stereoscopically visible image, and the third spatial information is information for generating an image that includes at least a stereoscopically invisible image.

12. The information processing device according to claim 11, wherein the second spatial information is information for generating an image that is more coarse-grained than an image which is generated by the first spatial information.

13. The information processing device according to claim 11, wherein the first spatial information and the second spatial information include at least one selected from the group consisting of an avatar of at least one other user with which avatar the user is capable of interaction and an object with which the user is capable of interaction and which is not the avatar.

14. The information processing device according to claim 10, wherein the third spatial information includes neither an avatar of at least one other user with which avatar the user is capable of interaction nor an object with which the user is capable of interaction.

15. The information processing device according to claim 10, wherein the at least one processor further carries out a first generation section for generating the second spatial information from fourth spatial information which indicates the virtual space in the one or more peripheral cells and which provides higher image resolution than the second spatial information.

16. The information processing device according to claim 10, wherein the at least one processor further carries out a second generation process for generating the third spatial information from fifth spatial information which indicates the virtual space in the one or more distant cells and which provides higher image resolution than the third spatial information.

17. The information processing device according to claim 10, wherein the at least one processor further carries out:

a first acquisition process for acquiring information pertaining to movement of the user in the virtual space; and a first changing process for referring to the information pertaining to the movement and changing at least one selected from the group consisting of a size and a shape of a region defined by the one or more peripheral cells.

18. The information processing device according to claim 10, wherein the at least one processor further carries out:

a second acquisition process for acquiring information pertaining to the number or density of at least one other user in the virtual space; and a second changing process for referring to the information pertaining to the number or the density of the at least one other user and changing a size of the one or more cells in the virtual space.

19. An information processing method wherein:

at least one processor carries out an acquisition process for acquiring second spatial information indicating a virtual space in one or more peripheral cells which are located around a reference cell serving as a cell in which a user is located in the virtual space, third spatial information indicating the virtual space in one or more distant cells which are located more distantly from the reference cell than the one or more peripheral cells, and sixth spatial information indicated at resolution independent of a distance from the reference cell; and the at least one processor carries out a displaying process for displaying an image in which the third spatial information is used at a lower resolution than that of an image in which the second spatial information is used.

20. A non-transitory, tangible computer-readable storage medium storing therein a program for causing a computer to carry out the acquisition process and the displaying process according to claim 19.

* * * * *